US012120730B2

(12) United States Patent
Zhang et al.

(10) Patent No.: US 12,120,730 B2
(45) Date of Patent: Oct. 15, 2024

(54) SCHEDULING REQUESTS, STATUS REPORTS, AND LOGICAL CHANNEL PRIORITIZATION

(71) Applicant: InterDigital Patent Holdings, Inc., Wilmington, DE (US)

(72) Inventors: Guodong Zhang, Woodbury, NY (US); Yifan Li, Conshohocken, PA (US); Pascal M. Adjakple, Great Neck, NY (US); Stephen E. Terry, Northport, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 180 days.

(21) Appl. No.: 17/555,933

(22) Filed: Dec. 20, 2021

(65) Prior Publication Data
US 2022/0369327 A1    Nov. 17, 2022

Related U.S. Application Data

(63) Continuation of application No. 16/621,088, filed as application No. PCT/US2018/037785 on Jun. 15, 2018, now Pat. No. 11,246,147.

(Continued)

(51) Int. Cl.
| | |
|---|---|
| *H04B 7/06* | (2006.01) |
| *H04L 1/18* | (2023.01) |
| *H04L 1/1812* | (2023.01) |
| *H04W 28/02* | (2009.01) |
| *H04W 72/12* | (2023.01) |
| *H04W 72/14* | (2009.01) |

(Continued)

(52) U.S. Cl.
CPC ........ *H04W 72/569* (2023.01); *H04B 7/0617* (2013.01); *H04L 1/1812* (2013.01); *H04W 28/0268* (2013.01); *H04W 28/0278* (2013.01); *H04W 72/21* (2023.01); *H04W 72/23* (2023.01); *H04W 74/0833* (2013.01)

(58) Field of Classification Search
None
See application file for complete search history.

(56) References Cited

U.S. PATENT DOCUMENTS

2011/0039568 A1\*  2/2011  Zhang .................. H04W 76/25
                                                         455/452.1
2011/0243076 A1   10/2011  Nguyen et al.
(Continued)

FOREIGN PATENT DOCUMENTS

CN             101695194 A       4/2010

OTHER PUBLICATIONS

Huawei et al., "Enhancements for SR and BSR", R2-1702603, 3GPP TSG-RAN WG2 #97bis, Apr. 2017, 5 Pages.
(Continued)

*Primary Examiner* — Hong Shao
(74) *Attorney, Agent, or Firm* — Flaster Greenberg, P.C.

(57) ABSTRACT

Features, methods, and functions for beam failure recovery and scheduling requests are provided, including methods for triggering, canceling, and transmitting beam recovery requests. The scheduling request may be designed to accommodate new criteria for transmission on a grant-free uplink shared channel (UL-SCH) and for putting the schedule request on hold.

19 Claims, 17 Drawing Sheets

Related U.S. Application Data

(60) Provisional application No. 62/520,226, filed on Jun. 15, 2017, provisional application No. 62/580,812, filed on Nov. 2, 2017, provisional application No. 62/615,716, filed on Jan. 10, 2018.

(51) Int. Cl.
*H04W 72/21* (2023.01)
*H04W 72/23* (2023.01)
*H04W 72/566* (2023.01)
*H04W 74/08* (2009.01)
*H04W 74/0833* (2024.01)

(56) References Cited

U.S. PATENT DOCUMENTS

| | | | |
|---|---|---|---|
| 2014/0029564 A1 | 1/2014 | Harada et al. | |
| 2015/0092675 A1* | 4/2015 | Choudhary | H04W 88/06 370/329 |
| 2016/0270121 A1* | 9/2016 | Bergström | H04W 74/0833 |
| 2018/0014322 A1 | 1/2018 | Loehr et al. | |
| 2018/0063869 A1 | 3/2018 | Zhang et al. | |
| 2018/0310308 A1 | 10/2018 | Loehr et al. | |
| 2019/0306850 A1* | 10/2019 | Zhang | H04B 7/0626 |
| 2020/0067590 A1* | 2/2020 | Wang | H04W 52/365 |
| 2020/0137775 A1 | 4/2020 | Tang | |
| 2020/0305167 A1 | 9/2020 | Freda et al. | |

OTHER PUBLICATIONS

Renesas Mobile Europe, "An optimization in logical channel prioritization", R2-133343, Oct. 2013, 3GPP TSG-RAN WG2 Meeting #83-bis, 4 Pages.

3GPP TR 38.913 V0.2.0, "3rd Generation Partnership Project; Technical Specification group Radio Access Network; Study on Scenarios and Requirements for Next Generation Access Technologies; (Release 14)", Feb. 2016, 19 pages.

3GPP TS 36.321 V14.2.1, "3rd Generation Partnership Project; Technical Specification Group Radio Access Network; Evolved Universal Terrestrial Radio Access (E-UTRA); Medium Access Control (MAC) Protocol Specification (Release 14)", Apr. 2017, 106 pages.

3GPP TSG-RAN WG2 #100 R2-01713467, Ericsson, "Open Issues on LCP", Nov. / Dec. 2017, 6 pages.

3GPP TSG-RAN WG2 #100 R2-1712365, Samsung Electronics R&D Institute UK, "LCP design for NR—focus on calculation and updating of Bj values in NR—and TP for TS 38.321", Dec. 2017, 6 pages.

3GPP TSG-RAN WG2 Meeting #AH-1801, R2-1800048, ASUSTek, "Discussion on the Relationship Between MAC CE and UL Grant for NR LCP", Jan. 2018, 4 pages.

3GPP TSG-RAN WG2 Meeting AH 1801 R2-1800580, Huawei, HiSilicon, "Remaining Issues on LCP Procedure", Jan. 2018, 2 pages.

3GPP TSG-RAN WG2 Meeting NR ad-hoc #2 R2-1801438, Qualcomm Incorporated, "Change Request on Overlapping Dynamic and Configured Grants", Jan. 2018, 4 pages.

3GPP TSG-RAN Wg2 NR Ad hoc 1804, R2-1800403, ZTE, Sanechips, "Further consideration on LCP Procedure", Jan. 2018, 5 pages.

3GPP TSG-RAN WG2 NR Ad Hoc, R2-1700115, Fujitsu, "MAC function for URLLC support", Jan. 2017, 3 pages.

3GPP TSG-RAN WG2 NR Adhoc Meeting, R2-1700022, "LCP Procedure Support of URLLC Traffic in Different Numerologies", Jan. 2017, 4 pages.

InterDigital Inc., "Details of the Logical Channel Prioritization Procedure for NR", 3GPP TSG RAN WG2 #98 R2-1704911, May 2017, 5 Pages.

* cited by examiner

SCHEDULING REQUESTS, STATUS REPORTS, AND LOGICAL CHANNEL PRIORITIZATION

CROSS-REFERENCE TO RELATED APPLICATIONS

This application is a continuation of U.S. patent application Ser. No. 16/621,088 filed Dec. 10, 2019 which is the National Stage Application of International Patent Application No. PCT/US2018/037785, filed Jun. 15, 2018, which claims the benefit of U.S. Provisional Application No. 62/520,226, filed Jun. 15, 2017, U.S. Provisional Application No. 62/580,812, filed Nov. 2, 2017 and U.S. Provisional Application No. 62/615,716, filed Jan. 10, 2018, the disclosures of which are hereby incorporated by reference in their entireties.

BACKGROUND

Machine-to-machine (M2M) systems, also called Internet-of-Things (IoT) or web of things (WoT) systems, often incorporate multiple interconnected heterogeneous networks in which various networking protocols are used to support diverse devices, applications, and services. These protocols have different functions and features, each optimized for one situation or another. There is no one-size-fits-all solution due to the diversity of devices, applications, services, and circumstances.

This disclosure pertains to nodes such as UE, eNB, NR Node, RRH, and TRP, and to the data link and physical layers of terminal and RAN systems, and similar nodes and layers in 3GPP and other M2M, IoT, WoT, and similar architectures. Such nodes, layers, and architectures are described, for example in: 3GPP TR 38.913 Study on Scenarios and Requirements for Next Generation Access Technologies, (Release 14), V0.2.0; Chairman's Note of 3GPP TSG RAN WG1 #88b; 3GPP TS 36.321 E-UTRA Medium Access Control (MAC) protocol specification, V15.0.0; 3GPP TS 38.321 NR Medium Access Control (MAC) protocol specification, V15.0.0; and 3GPP TS 38.331 NR Radio Resource Control (RRC) protocol specification, V15.0.0.

SUMMARY

Beam recovery may be facilitated via procedures and techniques for triggering, transmitting, and cancelling beam recovery requests (BRRs).

Scheduling requests may be transmitted on a grant-free uplink shared data channel (UL-SCH), and put on hold.

Beam recovery requests may be multiplexed with, and interact with, scheduling requests.

SR failure reporting and requests for Physical Uplink Control Channel (PUCCH) release may involve the use of SR failure types, where user equipment (UE) UE actions are based upon SR failure types. UE signaling of SR failure and requests for PUCCH release to the gNB may use RRC-based or MAC-based procedures.

A variable, e.g., Bj, may be used in a Logical Channel Prioritization (LCP) procedure to ensure the requirement of prioritized bit rate of a logical channel is met. For example, the elapsed time between transmission opportunities where uplink (UL) transmission takes place, but no data from logical channel j is served, may be used in the calculation of an updated value of Bj. Alternatively, the elapsed time between transmission opportunities where UL transmission takes place and UL data from logical channel j is actually served may be used in the calculation of the updated value of Bj.

Logical channel selection may be based on minimum and maximum logical channel latency scaled by the residual HARQ operating point in terms of block error rate (BLER) versus number of retransmissions for a given target BLER.

A timer may be used to delay scheduling request triggering when Buffer Status Reporting (BSR) is triggered and no UL-SCH grant is available for the transmission of the BSR, but there is a grant assigned to the UE who is not available yet, e.g., a grant that is available for use at a later time.

A timer may be used to delay the initiation of a RACH procedure when there is no PUCCH resource available to transmit an SR, or an SR transmission has reached the maximum number of scheduling request transmissions.

A BSR may be determined the context of overlapping grants, where rules are applied to decide which grant to use for the BSR. Rule may address situations, for example, where UL data transmission times of the grants overlap and end at the same time or different times, or where the grants do not overlap.

A timer may be used to delay a BSR. The BSR timer may be initiated by the MAC.

Features, methods, and functions for beam failure recovery and scheduling requests are provided, including methods for triggering, canceling, and transmitting beam recovery requests. The scheduling request may be designed to accommodate new criteria for transmission on a grant-free uplink shared channel (UL-SCH) and for putting the schedule request on hold.

DETAILED DESCRIPTION

Figure 1:
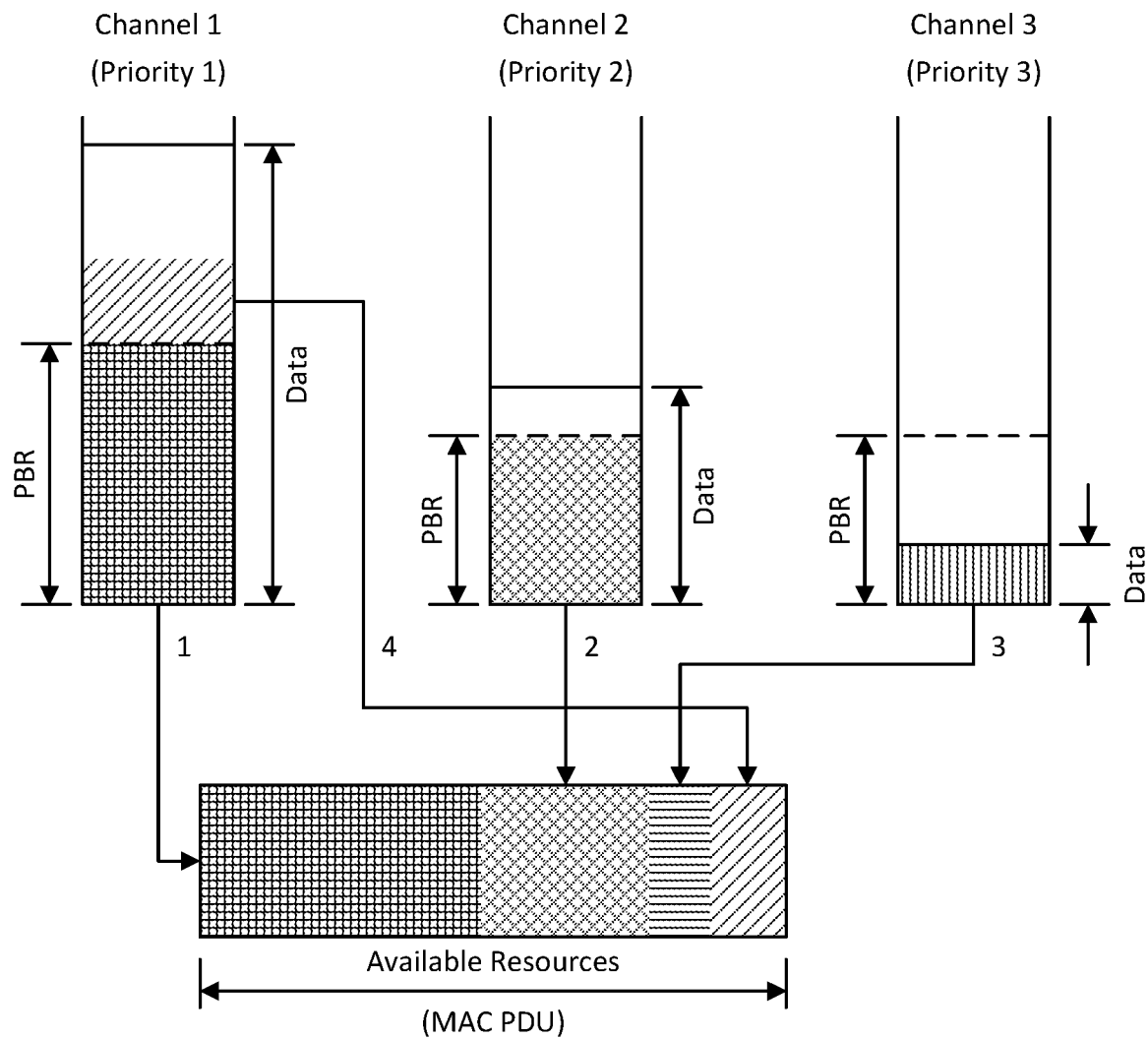
FIG. 1 illustrates an example of LTE Logical Channel Prioritization (LCP) for MAC multiplexing.

See Table 1 of the Appendix for a list of acronyms used herein.

3GPP TR 38.913 Study on Scenarios and Requirements for Next Generation Access Technologies; (Release 14), V0.2.0 3 defines scenarios and requirements for New Radio (NR) technologies. The Key Performance Indicators (KPIs) for eMBB, URLLC and mMTC devices are summarized in Table 2 of the Appendix.

In LTE/LTE-A, The Scheduling Request (SR) is used for requesting UL-SCH resources for new transmission.

UE's MAC triggers scheduling request when a regular BSR is triggered and UE doesn't have uplink resources for transmission of at least the regular BSR. Regular BSR is triggered when data becomes available for transmission in the uplink.

eNodeB needs to configure the UE with SR configuration via RRC signaling in order for the UE to transmit SR on PUCCH. The SR configuration structure is as given in Code Example 1 of the Appendix.

sr-PUCCH-ResourceIndex indicates the UE with the frequency domain resources whereas sr-ConfigIndex determines the time domain resources of PUCCH which carriers SR. eNodeB controls the maximum number SR transmissions from each UE on PUCCH using the parameter dsr-TransMax If the UE has no valid PUCCH resources (SR is either not configured or released), then the UE initiates Random Access procedure Once SR is triggered, the UE calculates the SR periodicity and offset (explained at the end of this post) which is based on sr-ConfigIndex IE. After transmitting the first SR on PUCCH, if the UE doesn't receive uplink resources from the eNodeB, then based on the periodicity, the UE re-sends SR on PUCCH. This process continues until the UE transmits SR for dsr-TransMax number of times on PUCCH if the UE doesn't receive uplink resources from the eNodeB. After transmitting SR for maximum (dsr-TransMax) number of times, the UE releases SR resources (frequency as well as time), initiates random access procedure and cancels all pending (triggered) SRs SR periodicities of 5, 10, 20, 40, and 80 ms are initially proposed in release-8. In release-9, short SR periodicities of 1 and 2 ms are introduced which reduces the latency.

When a short SR period is configured or when running VoIP traffic, the SR may be retransmitted unnecessarily. To avoid unnecessary SR transmissions, in release-9, an SR prohibit timer (sr-ProhibitTimer-r9) is introduced to reduce the load on PUCCH.

sr-ProhibitTimer-r9 IE is under mac-MainConfig and it may take values from 0 to 7. SR prohibit timer value is in number of SR period(s). Value 0 means no timer for SR transmission on PUCCH is configured. Value 1 corresponds to one SR period, Value 2 corresponds to 2*SR periods and so on. The UE starts this timer after transmitting an SR. When this timer is running, the UE is not supposed to be transmitting SR on PUCCH.

UE uses PUCCH Format 1 for transmitting SR alone.
When SR and HARQ feedback in uplink happens to coincide in the same subframe, the UE may transmit HARQ feedback on SR's frequency resource using PUCCH Format 1a/1b. Since PUCCH received is on SR resource, the eNodeB may easily understand that HARQ feedback and SR are present in the same subframe If the UE is not configured for simultaneous PUSCH and PUCCH transmission or, if the UE is configured for simultaneous PUSCH and PUCCH transmission and not transmitting PUSCH, in case of collision between CSI and SR in a same subframe, CSI is dropped A UE may release SR resources in a number of situations, such as: when a UE has transmitted SR for maximum amount times (dsr-TransMax); after a timeAlignmentTimer expiry; during a MAC reset procedure; and during Handover. During Handover, a MAC reset is performed.

During Handover, the source eNodeB has to provide the UE with a new SR configuration to be used in target eNodeB as the UE releases the existing SR resources in source eNodeB.

SR configuration table is given below (Table 10.1.5-1 from 3GPP TS 36.213). SR transmission instances are the uplink subframes satisfying $(10*SFN+\text{subframe}-N_{\textit{offset,SR}})$ mod $SR_{\textit{periodicity}}=0$. See Appendix Table 3—SR Configuration.

Beam Recovery Discussion in 5G NR

In current 3GPP standardization efforts on 5G NR, the several aspects of the beam recovery in NR were agreed and noted in the Chairman's Note of 3GPP TSG RAN WG1 #88b. UE Beam failure recovery mechanisms will include: beam failure detection; new candidate beam identification; beam failure recovery request transmission; UE monitoring a gNB response for beam failure recovery request. For beam failure detection, the UE will monitor beam failure detection RS to assess if a beam failure trigger condition has been met. Beam failure detection RS at least includes periodic CSI-RS for beam management. SS-block within the serving cell may be considered, if SS-block is also used in beam management as well. FFS may include trigger condition for declaring beam failure.

Other agreements include new candidate beam identification, beam failure recovery request transmission, and UE monitoring of a control channel search space to receive a gNB response for a beam failure recovery request.

New candidate beam identification may include a UE monitoring a beam identification RS to find a new candidate beam. The beam identification RS may include periodic CSI-RS for beam management, if it is configured by NW, and periodic CSI-RS and SS-blocks within the serving cell, if SS-block is also used in beam management as well.

Information carried by a beam failure recovery request may include: explicit or implicit information about identifying UE and new gNB TX beam information; explicit or implicit information about identifying UE and whether or not new candidate beam exists; information indicating a UE beam failure; and additional information, e.g., new beam quality.

Beam failure recovery request transmission may involve down-selection among options such as PRACH, PUCCH, PRACH-like options, e.g., with a different parameter for preamble sequence from PRACH.

A beam failure recovery request resource or signal may be additionally used for a scheduling request.

A UE may monitor a control channel search space to receive gNB response for beam failure recovery request. For example, the control channel search space may be same or different from the current control channel search space associated with serving BPLs. A UE may further react if the gNB does not receive beam failure recovery request transmission.

Also of interest is how to support at least one mechanism when an NW receives a beam failure recovery request. For example, an NW may assign a UL grant for beam reporting, transmits DL RS for beam measurement, and signal a beam indication or confirmation to the UE, etc. A UE may provide assistance for an NW decision regarding which mechanism to apply.

Of further interest is the situation of "no new candidate beam", e.g., whether or not there are issues, and if so, whether or not RLF procedure may sufficiently handle the issues.

The Logical Channel Prioritization (LCP) procedure may be applied for uplink transmission when a new transmission is performed. Radio Resource Control (RRC) signaling may control the scheduling of uplink data by signaling for each logical channel the following: a priority where an increasing priority value indicates a lower priority level, prioritisedBitRate which sets the Prioritized Bit Rate (PBR), and bucketSizeDuration which sets the Bucket Size Duration (BSD). For NB-IoT, prioritisedBitRate, bucketSizeDuration and the corresponding steps of the Logical Channel Prioritization procedure (i.e., Step 1 and Step 2 below) may not be applicable.

The MAC entity may maintain a variable Bj for each logical channel j. Bj may be initialized to zero when the related logical channel is established, and incremented by the product of PBR×Transmission Time Interval (TTI) duration for each TTI, where PBR is Prioritized Bit Rate of logical channel j. Data credit may be accumulated for each logical channel over a period of time while the logical channel waits in queue to be served, such that when it is the turn for that logical channel to be served as per the logical channel priority order, the amount of data served from that logical channel may meet the prioritized bit rate requirement of the logical channel. The value of Bj may not exceed the bucket size, and if the value of Bj is larger than the bucket size of logical channel j, Bj is set to the bucket size. The bucket size of a logical channel may be equal to PBR×BSD, where PBR and BSD are configured by upper layers.

The MAC entity may allocate resources to the logical channels in accordance with the Logical Channel Prioritization procedure when a new transmission is performed as follows:

Step 1: All the logical channels with Bj>0 may be allocated resources in a decreasing priority order. If the PBR of a logical channel is set to "infinity," the MAC entity may allocate resources for all the data that is available for transmission on that logical channel before meeting the PBR of the lower priority logical channel(s);

Step 2: the MAC entity may decrement Bj by the total size of MAC SDUs served to logical channel j in Step 1; the value of Bj may be negative.

Step 3: if any resources remain, all the logical channels may be served in a strict decreasing priority order (regardless of the value of Bj) until either the data for that logical channel or the UL grant is exhausted, whichever comes first. Logical channels configured with equal priority may be served equally.

During the Logical Channel Prioritization procedure, the MAC entity may take into account the following relative priority in decreasing order: MAC control element for C-RNTI or data from UL-CCCH; MAC control element for BSR, with the exception of the BSR included for padding; MAC control element for PHR, Extended PHR, or Dual Connectivity PHR; MAC control element for Sidelink BSR, with exception of Sidelink BSR included for padding; data from any Logical Channel, except data from UL-CCCH; MAC control element for BSR included for padding; MAC control element for Sidelink BSR included for padding.

When the MAC entity is requested to transmit multiple MAC PDUs in one TTI, steps 1 to 3 as described above and the associated rules may be applied either to each grant independently or to the sum of the capacities of the grants. Also, the order in which the grants are processed is left up to the UE implementation. It is up to the UE implementation to decide in which MAC PDU a MAC control element is included when the MAC entity is requested to transmit multiple MAC PDUs in one TTI. When the UE is requested to generate MAC PDU(s) in two MAC entities in one TTI, it is up to UE implementation in which order the grants are processed.

The MAC entity may multiplex MAC control elements and MAC SDUs in a MAC PDU according to the above.

An example of the LTE logical channel prioritization operation for MAC multiplexing is depicted in FIG. 1, with channel 1, channel 2 and channel 3 being in a decreasing order of priority. Referring to FIG. 1, channel 1 is served up to its PBR, channel 2 up to its PBR, and then channel 3 is served with as much data as is available (since in this example the amount of data available is less than would be permitted by the PBR configured for that channel). Then the remaining space in the MAC PDU is filled with data from channel 1, which is of the highest priority until there is no further room in the MAC PDU or there is no further data from channel 1. If there is still room after serving channel 1, channel 2 is served in a similar way.

With beam recovery request (BRR) being designed as a L1 signal in NR, and it is event-driven not scheduled-based, this will inevitably interact with other non-scheduled uplink L1 signals, such as SR and HARQ ACK/NACK in terms of transmission resource and potential collision in time domain. Therefore, appropriate design solutions are needed to solve these problems.

In LTE, the scheduling request signaling and procedures are designed based on single use case MBB, Omni-directional transmission and two available channels for transmission: PUCCH and PRACH. In NR, three use cases (EMBB, URLLC, mMTC) are supported, beamforming will be used for both control and data channel transmission, and grant-less uplink transmission is introduced as well. Therefore, appropriate design solutions for SR are needed to support new Use cases and take advantages of beamforming and grant-less UL transmission.

2.5 Logical Channel Prioritization

The Logical Channel Prioritization procedure is applied for uplink transmission when a new transmission is performed.

RRC controls the scheduling of uplink data by signaling for each logical channel: priority where an increasing priority value indicates a lower priority level, prioritisedBitRate which sets the Prioritized Bit Rate (PBR), bucketSizeDuration which sets the Bucket Size Duration (BSD). For NB-IoT, prioritisedBitRate, bucketSizeDuration and the corresponding steps of the Logical Channel Prioritization procedure (i.e., Step 1 and Step 2 below) are not applicable.

The MAC entity may maintain a variable Bj for each logical channel j. Bj may be initialized to zero when the related logical channel is established, and incremented by the product PBR×TTI duration for each TTI, where PBR is Prioritized Bit Rate of logical channel j. The idea here is to accumulate data credit for each logical channel over a period of time while the logical channel waits in queue to be served, such that when it is the turn for that logical channel to be served as per the logical channel priority order, the amount of data served from that logical channel meets the prioritized bit rate requirement of the logical channel. It should be noted that, the value of Bj may never exceed the bucket size and if the value of Bj is larger than the bucket size of logical channel j, it may be set to the bucket size. The bucket size of a logical channel is equal to PBR×BSD, where PBR and BSD are configured by upper layers.

The MAC entity may perform the following Logical Channel Prioritization procedure when a new transmission is performed, in order to allocate resources to the logical channels. In step 1, all the logical channels with Bj>0 are allocated resources in a decreasing priority order. If the PBR of a logical channel is set to "infinity", the MAC entity may allocate resources for all the data that is available for transmission on the logical channel before meeting the PBR of the lower priority logical channel(s).

In step 2, the MAC entity decrements Bj by the total size of MAC SDUs served to logical channel j in Step 1; the value of Bj may be negative.

In step 3, if any resources remain, all the logical channels are served in a strict decreasing priority order (regardless of the value of Bj) until either the data for that logical channel or the UL grant is exhausted, whichever comes first. Logical channels configured with equal priority should be served equally.

For the Logical Channel Prioritization procedure, the MAC entity may take into account the following relative priority in decreasing order: MAC control element for C-RNTI or data from UL-CCCH; MAC control element for BSR, with exception of BSR included for padding; MAC control element for PHR, Extended PHR, or Dual Connectivity PHR; MAC control element for Sidelink BSR, with exception of Sidelink BSR included for padding; data from any Logical Channel, except data from UL-CCCH; MAC control element for BSR included for padding; MAC control element for Sidelink BSR included for padding.

When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

The MAC entity may multiplex MAC control elements and MAC SDUs in a MAC PDU according to the above.

An example of LTE logical channel prioritization operation for MAC multiplexing is depicted in FIG. 1, with channel 1, channel 2 and channel 3 being in a decreasing order of priority.

First, channel 1 is served up to its PBR, channel 2 up to its PBR and then channel 3 with as much data as is available (since in this example the amount of data available is less than would be permitted by the PBR configured for that channel). After that, the remaining space in the MAC PDU is filled with data from the channel 1 which is of the highest priority until there is no further room in the MAC PDU or there is no further data from channel 1. If there is still room after serving the channel 1, channel 2 is served in a similar way.

3 Example Challenges

Challenge 1

A first challenge is that, if Beam Recovery Request (BRR) is implemented as a L1 signal in NR, and therefore is event-driven not scheduled-based, BRR will inevitably interact with other non-scheduled uplink L1 signals, such as SR and HARQ ACK/NACK, both in terms of transmission resource and potential collision in time domain.

Challenge 2

A second challenge is that in LTE, the scheduling request signaling and procedures are designed based on single use case MBB, Omni-directional transmission and two available channels for transmission: PUCCH and PRACH. In NR, three use cases (EMBB, URLLC, mMTC) are supported, and beamforming will be used for both control and data channel transmission, and grant-less uplink transmission is introduced as well.

In NR, the concept of Transmission Time Interval (TTI) as the time interval of a fixed duration between transmission opportunities may be replaced, or redefined, as a result of support of multiple numerologies by a UE. Each of these numerologies may be characterized by a different subcarrier spacing and therefore different symbol duration, slot duration, and mini-slot duration. A key issue that needs to be addressed in NR is how to maintain the variable Bj over time, in the absence of an LTE-like TTI concept.

Another LCP related problem is the issue of logical channel restriction from using an UL resource grant that does not fulfill the allowable latency requirement of the logical channel. There is a need to ensure that a logical channel is only allowed to use an UL resource grant when the UL resource grant fulfills the allowable latency requirement of the logical channel.

Regarding a Scheduling Request (SR), a number of agreements have been made in RAN2.

An SR configuration consists of a collection of sets of PUCCH resources across different BWPs and cells with the constraint that, per cell, at any given time there is at most one usable PUCCH resource per LCH. This corresponds to the case of one single LTE-like set of SR PUCCH resources being configured per LCH per BWP, and only one BWP being active at a time.

Each LCH is mapped to none or one SR configuration.

Each SR configuration has its own SR counter and prohibit timer. This counter and timer control the SR configuration i.e. SR procedures on the group of LCHs mapped to the SR configuration in question. When a max SR transmission counter is reached on a SR configuration, SR failure is declared and the UE triggers a RACH and releases all PUCCH resources. SR counters and timers are independent across different configurations.

BWP switching and cell activation/deactivation do not interfere with the operation of the counter and timer.

As per the agreements above, when the maximum value of an SR transmission counter is reached on a SR configuration, an SR failure is declared and the UE triggers a RACH and releases all PUCCH resources. The UE may take this action even though there may be other PUCCH resources potentially with an SR pending. In such a case, there is a need to notify the network of the SR failure on the original resource. Furthermore, the action of releasing all PUCCH resources and initiating the RACH procedure is a costly procedure. Therefore, it is important to use this remedy as a last resort option, therefore additional methods that include criteria for when it is acceptable to use the other SR resource may be considered.

Challenge 3

A third challenge is that, in NR, the concept of Transmission Time Interval (TTI) as the time interval of fixed duration between transmission opportunities is being replaced or redefined as a result of support of multiple numerologies by the UE where each numerology is characterized by a different subcarrier spacing and therefore different symbol duration, slot duration and mini-slot duration.

A key issue that needs to be addressed in NR is how to maintain the variable Bj over time, in the absence of LTE-like TTI concept.

A Logical Channel Prioritization (LCP) related problem is the issue of logical channel restriction from using an UL resource grant that does not fulfil the allowable latency requirement of the logical channel or equivalently stated, how to ensure a logical channel is only allowed to use an UL resource grant when the UL resource grant fulfils the allowable latency requirement of the logical channel.

Challenge 4

A fourth challenge is that an SR configuration may consist of a collection of sets of PUCCH resources across different BWPs and cells where, per cell, at any given time there is at most one usable PUCCH resource per LCH. This corresponds to the case of one single LTE-like set of SR PUCCH resources being configured per LCH per BWP, and only one BWP being active at a time. Each LCH may be mapped to none or one SR configuration.

Each SR configuration may have its own SR counter and prohibit timer. This counter and timer control the SR configuration i.e. SR procedures on the group of LCHs mapped to the SR configuration in question. When max SR transmission counter is reached on a SR configuration, SR failure is declared and the UE triggers a RACH and releases all PUCCH resources. SR counters and timers are independent across different configurations.

RAN2 has agreed that BWP switching and cell activation/deactivation should not interfere with the operation of the counter and timer.

Per RAN2, when the maximum value of SR transmission counter is reached on a SR configuration, SR failure is declared and the UE triggers a RACH and releases all PUCCH resources. The UE may take this action even though there may be other PUCCH resources potentially with SR pending. In such a case, there is a need to notify the network of the SR failure on the original resource. Furthermore, the action of releasing all PUCCH resources and initiating RACH procedure is a costly procedure. may

Challenge 5

A fifth challenge is that in LTE, 3GPP TS 36.321 E-UTRA Medium Access Control (MAC) protocol specification, V15.0.0, stipulates that for triggering a Scheduling Request (SR), if the Buffer Status reporting procedure determines that at least one BSR has been triggered and not cancelled, and the MAC entity has UL resources allocated for new transmission for this TTI, then: instruct the Multiplexing and Assembly procedure to generate the BSR MAC control element(s); start or restart periodicBSR-Timer except when all the generated BSRs are Truncated BSRs; and start or restart retxBSR-Timer. If the Buffer Status reporting procedure determines that at least one BSR has not been triggered or is cancelled, then if a Regular BSR has been triggered and logicalChannelSR-ProhibitTimer is not running, if an uplink grant is not configured or the Regular BSR was not triggered due to data becoming available for transmission for a logical channel for which logical channel SR masking (logicalChannelSR-Mask) is setup by upper layers, then Scheduling Request may be triggered.

The NR text regarding the triggering of SR is captured in 3GPP TS 38.321 NR Medium Access Control (MAC) protocol specification, V15.0.0, stipulates that >if the Buffer Status reporting procedure determines that at least one BSR has been triggered and not cancelled, and UL-SCH resources are available for a new immediate transmission, then the MAC entity may: instruct the Multiplexing and Assembly procedure to generate the BSR MAC CE(s); start or restart periodicBSR-Timer except when all the generated BSRs are long or short Truncated BSRs; and start or restart retxBSR-Timer. If the Buffer Status reporting procedure determines that at least one BSR has not been triggered or is cancelled, and a Regular BSR has been triggered and logicalChannelSR-DelayTimer is not running, the MAC entity may trigger a Scheduling Request if an uplink grant is not a configured grant and the Regular BSR was not triggered for a logical channel for which logical channel SR masking (logicalChannelSR-Mask) is setup by upper layers.

A logicalChannelSR-DelayTimer is used to delay the transmission of an SR for logical channels enabled by logicalChannelSR-Delay. A value TRUE or supported for logicalChannelSR-Delay indicates that the logicalChannelSR-DelayTimer is enabled/supported for the logical channel. NR only (optionally) configures the field (i.e. indicates value TRUE) if logicalChannelSR-DelayTimer is configured. It should be noted that logicalChannelSR-Delay as defined here is same as logicalChannelSR-DelayTimerApplied defined in 3GPP TS 38.331 NR Radio Resource Control (RRC) protocol specification, V15.0.0

In a nutshell, current SR triggering specification may be summarized as followed: in LTE case, an SR may be triggered if no UL grant is available in a TTI where at least one BSR has been triggered and not cancelled, and in NR case, an SR may be triggered if at least one BSR has been triggered and not cancelled and no UL-SCH resource is available for a new immediate transmission. However, there are situations where the triggering of the SR might not be appropriate. One example is illustrated in FIG. 2.

Figure 2:
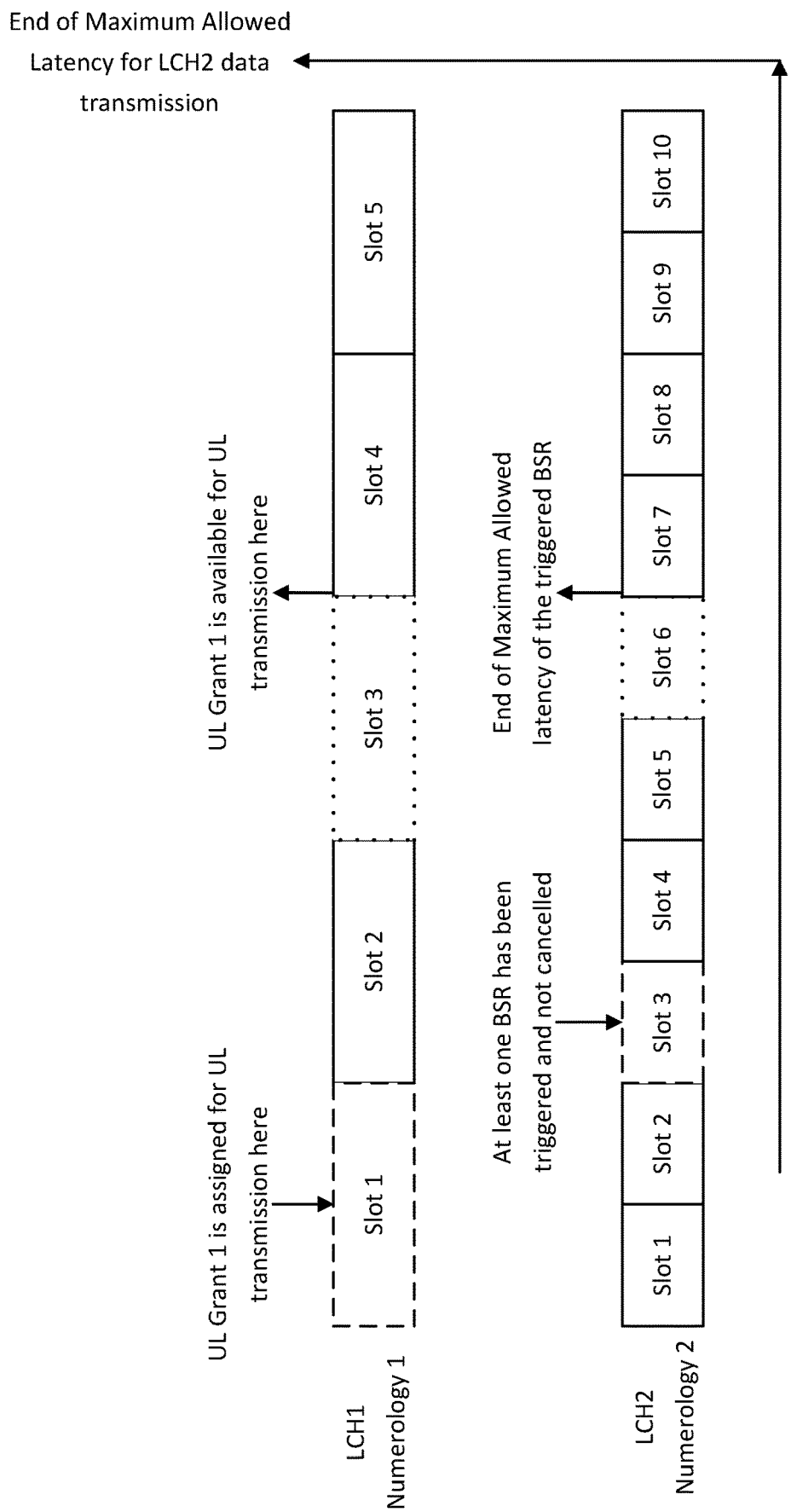
FIG. 2 illustrates an example of a triggered BSR with no available UL grant and no immediate SR triggered.
Figure 3:
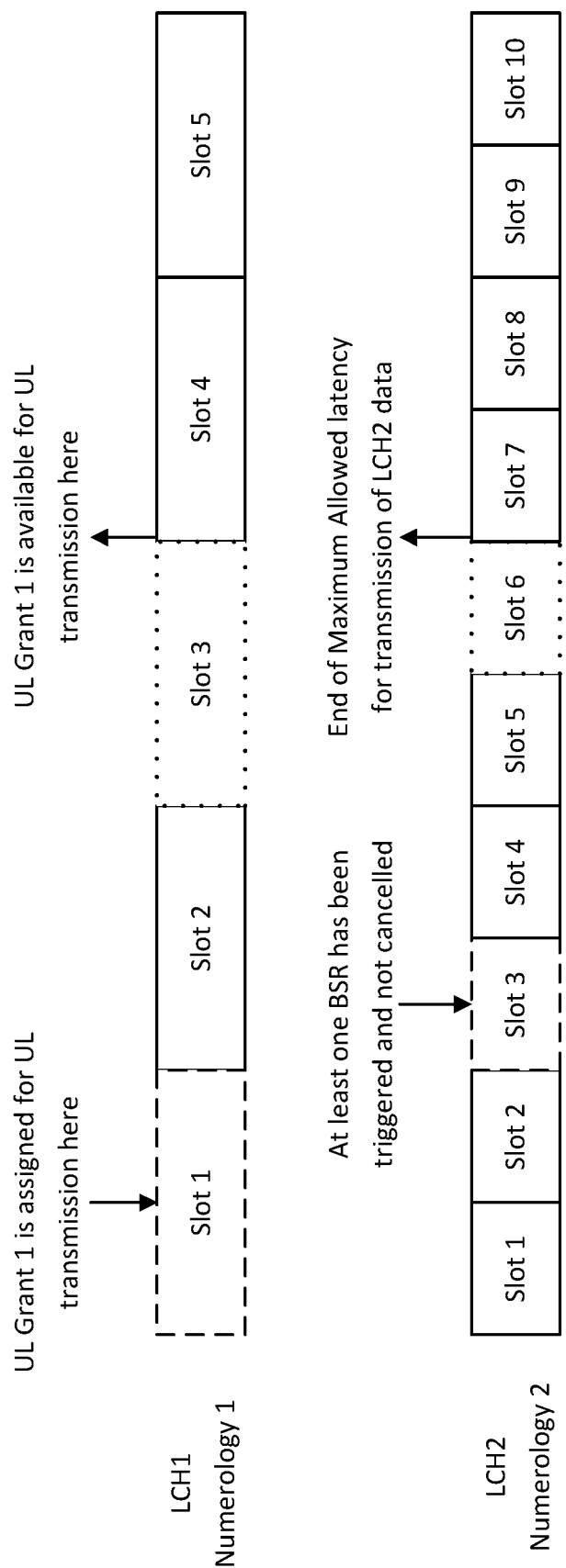
FIG. 3 illustrates an alternative example of a triggered BSR with no available UL grant and no immediate SR triggered.

As illustrated in FIG. 2, a BSR has been triggered and not cancelled while there is a grant that has been received but the grant resource is not yet available. As per the current specification, an SR will be transmitted in such case. Depending on the latency requirement for example as illustrate in FIG. 2, an immediate triggering of SR in the example illustrated in FIG. 2 is a waste of resources and UE processing. In the example illustrated in FIG. 2, one may assumes data on logical channel LCH2 may not be transmitted using resource grant with numerology 1. However, if it is assumed that data on logical channel LCH2 may also use resource grant with numerology 1, then UL Resource Grant 1 may be used to transmit data of LCH2, and also BSR as there might still be a need to transmit a BSR even as data on LCH2 is transmitted using UL Resource Grant 1 since this resource grant may not be enough to transmit all data available in both logical channels LCH1 and LCH2 buffers, or arrival of new data might have triggered a new BSR as well. Also in this case as illustrated in FIG. 3, an immediate triggering of SR when there is already triggered BSR that is not cancelled but there is no UL resource grant to transmit the BSR will lead to waste of resources and UE processing. Furthermore, if random access is initiated due to lack of PUCCH resource to send SR or due to SR transmission reaching maximum number of allowed re-transmission, and then a grant becomes available to the UE. For example a grant already allocated to the UE becomes available for UL transmission, there should be specified criteria for the triggering and the cancelling of the RACH procedure.

Another SR related open issue is the example where there are multiple pending SRs. In such a situation, one question to address is which SR configuration and PUCCH resource should be used for the transmission of the SR.

Challenge 6

A sixth challenge is that, in NR, there will be situations where grants overlap. Several examples are illustrated as shown in FIGS. 4-8. In these examples, the mechanism for buffer status calculation for each grant, at the point the MAC PDU is transmitted, needs to be appropriately designed.

Approaches to Beam Recovery

Beam Failure Recovery Procedures for when Only UL Beam Fails

When the UL beam fails but the DL beam is still functioning, a gNB may monitor the beam quality of the UL serving beam and candidate beams by processing the UL RS (such as SRS and/or DM-RS). When the beam quality of the serving beam becomes below a pre-defined threshold or K dB worse than the beam quality of another beam, the gNB may initiate the UL beam failure recovery procedures as follows:

If UL candidate beams quality is known at the gNB, it may send a UL beam switching command to the UE in the downlink. The uplink beam switching command may be signaled in the format of M bits representing a beam ID or a beam tag ID (shortened compared to the full-dimension beam ID and known between the pair of UE and gNB). The UL beam switching command may be carried in a new DCI format, in other existing NR-PDCCH formats (such as UL or DL grants), in a re-used NR-PDCCH format or in MAC CE (in NR-PDSCH). Since the UL beam switching command may have impact on UL transmission in many subsequent sub-frames, it should be designed with high reliability. Signaling UL beam switching command in MAC CE of a NR-PDSCH has the advantages of ACK/NACK feedback from the UE. If UL beam switching command is signaled using a re-used DCI format, say using DCI format 0 without a valid uplink scheduling grant, several fields such as HARQ process ID, MCS level, TPC command, redundancy, DMRS cyclic shift and etc. may be set to '0' or '1' (serve as "virtual CRC") to increase the detection reliability. If UL beam switching command is signaled using a new DCI format, either strong polar coding should be applied or time-domain and/or frequency-domain spreading codes/sequences should be applied to increase reliability of the UL beam switching command.

If UL candidate beams quality is not known at the gNB, it may initiate the UL beam training procedure by sending an aperiodic (or periodic) UL beam training command to the UE in the downlink. The uplink beam training command may be signaled in the format of SRS resources (in terms of SRS cyclic shift, port) and subset of uplink beams to transmit SRS. The UL beam training command may be carried in a new DCI format, in other existing NR-PDCCH formats (such as UL or DL grants), in a re-used NR-PDCCH format or in MAC CE (in NR-PDSCH). Upon receiving the UL beam training command, the UE may suspend transmission of any pending SRS until it receives a valid UL beam switching command from the gNB successfully. The UE may also need to suspend other previously scheduled or configured uplink transmission (such as semi-persistently scheduled PUSCH, CSI feedback, cross-scheduled NR-PUSCH, SRS transmission, etc.).

Beam Recovery Request Procedures where DL Beam Fails

When the DL beam fails, the UE cannot receive DL signal using the current serving DL beam. The gNB initiated beam failure recovery scheme used when the only UL beam fails may not be used here. Rather, when the DL beam fails, the UE needs to send beam failure recovery signal, such as a beam recovery request, in the UL first to the gNB, then re-establish the DL beam, if only the DL beam failed, or UL and DL beams, if both the UL and DL beams failed between the gNB and the UE.

It is advantageous that the UL and DL beam maintenance procedures use periodic or aperiodic beam training, and generates a periodic or aperiodic UL and DL beam report. Depending on the particular beam maintenance scheme being used, at a TTI, the candidate beam information may be known or unknown (or stale) to the UE and/or gNB.

The Basic Principles of Beam Failure Recovery Procedures

The inventors observe that it is generally advantageous to observer the following five principles in beam failure recovery procedures.

First, each BPL multi-connectivity or CoMP case may be better served with a separate beam failure recovery procedure.

Second, if UL beam does not fail (but the DL beam fails, the UE may transmit BRR on a PUCCH configured for BRR. If no PUCCH configured for BRR, but a dedicated PRACH resources is configured for BRR, then the UE transmit BRR on configured dedicated PRACH. Otherwise, transmit BRR on PRACH resources pool configured for the purpose of BRR (not reserved for a specific UE).

Third, if the UL beam fails, the UE may not be able to transmit BRR on a PUCCH configured for BRR. If a dedicated PRACH resources is configured for BRR, then the UE transmit BRR on configured dedicated PRACH; otherwise, transmit BRR on PRACH resources pool configured for the purpose of BRR (not reserved for a specific UE).

Fourth, when the UL beam fails, and the UE needs to transmit BRR on PRACH, the UE may perform beam sweeping on PRACH. If the UL candidate beams are known to the UE via beam maintenance procedures and signaling, the UE may sweep these candidate beams first, and the beam sweeping order may be arranged in the order of descending beam quality of candidate beams. Alternatively, the candidate beams that have spatial QCL relationship with the failed beam may be swept first before the applying the order of beam quality.

Fifth, when the UL beam fails, and the UE needs to transmit BRR on PRACH, the UE may perform beam sweeping on PRACH. If the UL candidate beams are unknown to the UE via beam maintenance procedures and signaling, the UE need to sweep all the beams or a subset of beams, and the beam sweeping order may be arranged in the order of the beams that have spatial QCL relationship with the failed beam are swept first and then other beams.

Beam failure recovery early termination criteria:

The UE may utilize the L3 measurement, or a long-term measurement, to determine whether it should perform beam failure recovery or declare out of sync to higher layer immediately.

For example, such an L3 measurement may be L3 RSRP measurement of a cell or TRxP (measured across multiple beams). If the L3 cell quality measurement of the current serving cell/TRxP is below a predefined threshold or KBF dB worse than the L3 cell quality measurement of the other cells/TRxPs, the UE may determine that the current serving cell has no other good candidate beams, therefore it may choose to skip beam failure recovery.

Alternatively, for example, such an L3 measurement may be L3 RSRP measurement of the current serving beam. If the L3 RSRP measurement of other beam is worse than L3 RSRP measurement of serving beam, or is better than serving beam but still below a pre-defined threshold corresponding to acceptable channel quality, then the UE may determine that the current serving cell has no other good candidate beams, therefore it may choose to skip beam failure recovery.

Beam Failure Recovery Procedures

Beam failure recovery may be achieved in a number of ways. For example, a Beam Recovery Request (BRR) may be used for initiating the beam failure recovery process between the Tx and Rx beam link pair. When the beam failure recovery criteria is met for a particular beam pair link (BPL) i, a BRR is triggered for that BPL.

When a BRR is triggered, it may be considered as pending until it is cancelled. All pending BRR(s) for BPL i may be cancelled and brr-ResponseWindowTimer may be stopped when a valid beam recovery response is received successfully.

It is optional that the UE may evaluate the beam failure recovery early termination criteria (described above). If accelerated beam recovery criteria is met (no better beam available), the UE may skip the following beam recovery procedures and declare out-of-sync to higher layers. Otherwise, the UE may proceed to the steps below.

If a BRR is triggered for BPL i and there is no other BRR pending, the MAC entity may set the BRR_COUNTER for BPL i to 0.

If at least one BRR is pending for BPL i, the MAC entity may perform processing for each TTI. If the UE knows that its UL beam quality is still acceptable for communication, and the MAC entity has at least one valid NR-PUCCH resource for BRR configured or a NR-PUSCH scheduled or has at least one valid dedicated NR-PRACH resource for BRR configured for this TTI, and this TTI is not part of a measurement gap or Sidelink Discovery Gap for Transmission and if brr-ResponseWindowTimer is not running, then processing may depend on the BRR_COUNTER for BLP i.

If BRR_COUNTER for BLP i<dbrr-TransMax, then the UE may: increment BRR_COUNTER for BLP i by 1; instruct the physical layer to signal the BRR on one valid PUCCH resource for BRR, or transmit BRR on one valid dedicated PRACH resource configured for BRR or piggyback the BRR on the scheduled NR-PUSCH; and start the brr-ResponseWindow Timer.

If BRR_COUNTER for BLP i is not <dbrr-TransMax, then the UE may: notify RRC to release PUCCH or dedicated PRACH resources configured for BRR of BPL i for all serving cells; notify RRC to release SRS of BPL i for all serving cells; clear any configured downlink assignments and uplink grants; initiate a Random Access procedure on the SpCell and cancel all pending BRRs; and notify higher layer that beam failure recovery has failed and declare out-of-sync.

If the MAC entity has no valid NR-PUCCH resource for BRR configured in any TTI, no valid dedicated NR-PRACH resource for BRR configured in any TTI, and no NR-PUSCH scheduled in any TTI, but has at least one grant-free NR-PUSCH transmission opportunity for this TTI, then if this TTI is not part of a measurement gap or Sidelink Discovery Gap for Transmission and if brr-ResponseWindow Timer is not running, processing may proceed according to BRR_COUNTER.

If BRR_COUNTER for BLP i<sbrr-TransMax, the UE may: increment BRR_COUNTER for BLP i by 1; instruct the physical layer to signal the BRR on an available Grant-free NR-PUSCH (if the UE has no user data to transmit), or piggyback the BRR on a Grant-free NR-PUSCH (if the UE has user data to transmit on this Grant-free NR-PUSCH); and start the brr-ResponseWindowTimer.

If BRR_COUNTER for BLP i is not <sbrr-TransMax, the UE may: notify RRC to release SRS of BPL i for all serving cells; clear any configured downlink assignments and uplink grants; initiate a Random Access procedure on the SpCell and cancel all pending BRRs; and notify higher layer that beam failure recovery has failed and declare out-of-sync.

If the MAC entity has no valid NR-PUCCH resource or valid dedicated NR-PRACH resource for BRR of BPL i configured in any TTI, no NR-PUSCH scheduled in any TTI, no grant-free NR-PUSCH transmission opportunity in any TTI and if "skipping random access" is not configured: initiate a Random Access procedure using the PRACH resources configured (but not dedicated) for BRR of BPL i on the SpCell and cancel all pending BRRs of BPL i.

If the UE knows that its UL beam quality is no longer acceptable (for example, UL beam is reciprocal to DL beam, or known via gNB DL signalings, or UE self-detection), the UE may not transmit BRR on PUCCH resource configured for BRR transmission. How the UE proceeds may depend on having a dedicated NR-PRACH resource.

If the MAC entity has at least one valid dedicated NR-PRACH resource for BRR configured for this TTI and if this TTI is not part of a measurement gap or Sidelink Discovery Gap for Transmission and if brr-ResponseWindow Timer is not running, then processing may depend on the BRR_COUNTER for BLP i.

If BRR_COUNTER for BLP i<dbrr-TransMax, the UE may: increment BRR_COUNTER for BLP i by 1; instruct the physical layer to signal the BRR on one dedicated PRACH resource configured for BRR with UL beam sweeping; and start the brr-ResponseWindow Timer.

If BRR_COUNTER for BLP i is not <dbrr-TransMax, the UE may: notify RRC to release NR-PUCCH and dedicated PRACH resources configured for BRR of BPL i for all serving cells; notify RRC to release SRS of BPL i for all serving cells; clear any configured downlink assignments and uplink grants; initiate a Random Access procedure on the SpCell and cancel all pending BRRs; and notify higher layer that beam failure recovery has failed and declare out-of-sync.

If the MAC entity has no valid dedicated NR-PRACH resource for BRR of BPL i configured in any TTI and if "skipping random access" is not configured: initiate a Random Access procedure using the PRACH resources configured (but not dedicated) for BRR of BPL i on the SpCell with UL beam sweeping and cancel all pending BRRs of BPL i.

If the UL candidate beams are known to the UE via beam maintenance procedures and signaling, the UE may sweep these candidate beams first, and the beam sweeping order may be arranged in the order of descending beam quality of candidate beams.

If there are BRR pending for more than one BPL, the UE may transmit on configured PUCCH resources one by one according to the configuration or transmit one BRR on a single PUCCH.

Transmit power of BRR needs to be adjusted. Regular PUCCH/PRACH Tx power+margin (for broken beam link).

The procedures of BRR needs to consider the re-transmission of BRR if no proper response is received within a time window.

BRR_COUNTER is incremented for each BRR bundle. brr-ResponseWindow Timer is started in the first TTI of an BRR transmission process, and its value equals to the BRR ResponseWindow size.

Figure 9:
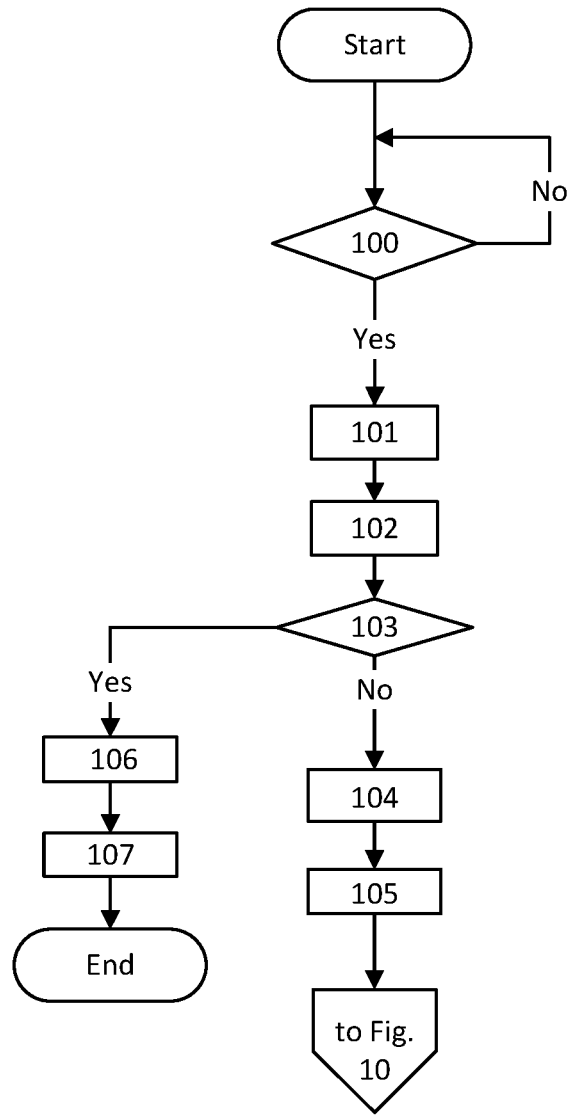
FIGS. 9 and 10 are a flow chart of an example beam failure recovery method.
Figure 10:
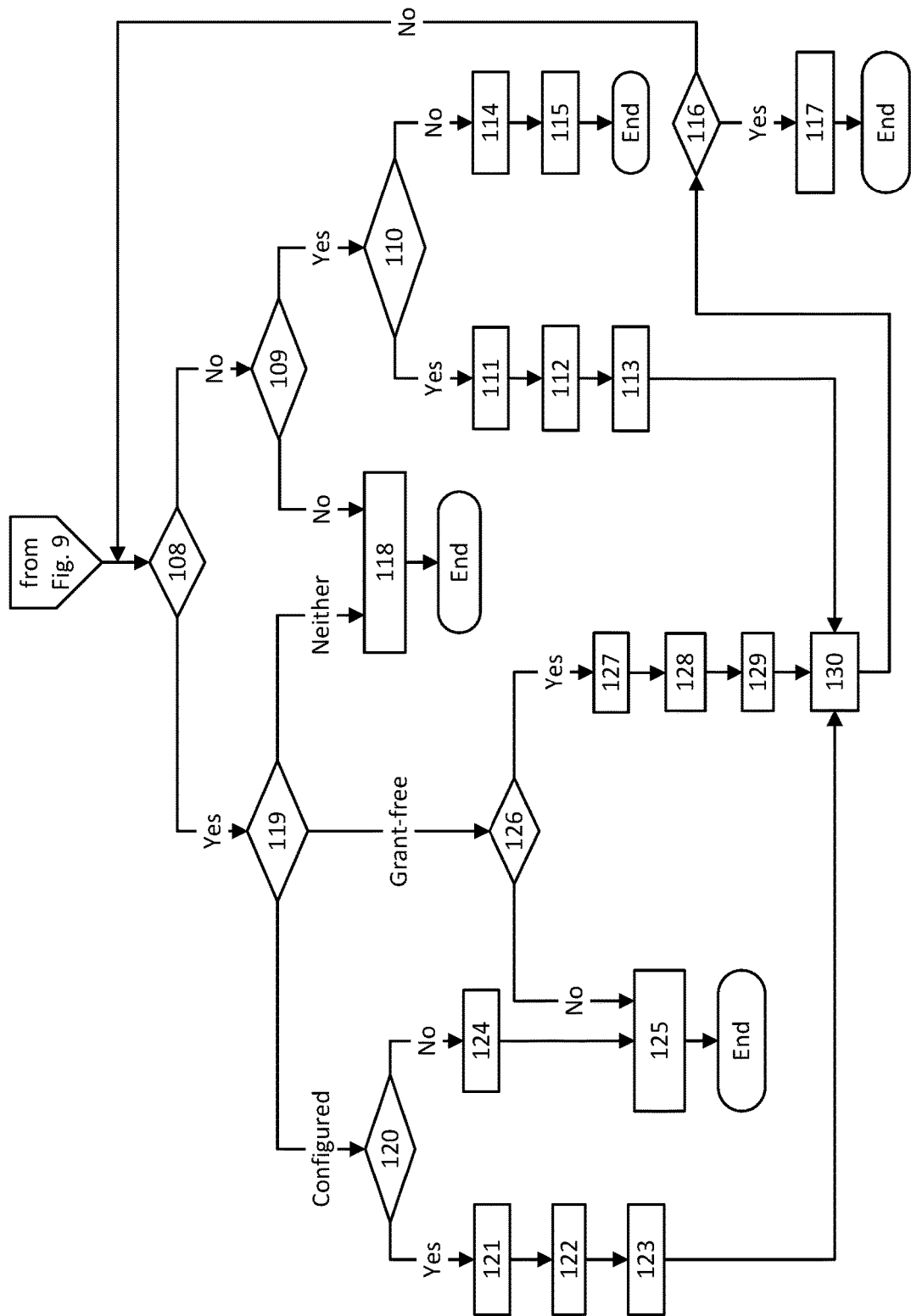

A flow chart of an examplebeam failure recovery procedure is depicted in FIGS. 9 and 10.

Referring to FIG. 9, in step 100, a UE check whether beam failure recovery criteria are met. If so, in step 101, a BRR is triggered. The BRR remains pending until cancelled. Then in step 102, the UE evaluates the beam failure recovery early termination criteria.

In step 103, the UE checks whether beam failure recovery early termination criteria are met. If so, then in step 106 the beam failure recovery procedures are skipped. Then in in step 107 the RRC is notified to: release SRS of BPL i for all serving cells; clear any configured downlink assignments and uplink grants; initiate a Random Access procedure on the SpCell and cancel all pending BRRs; notify higher layer that beam failure recovery has failed; and declare out-of-sync, ending the method.

If in step 103 the early termination criteria are not met, then in step 104, if a BRR is triggered for BPL i and there is no other BRR is pending, the MAC entity may set the BRR_COUNTER for BLP i to 0. Then in in step 105, As long as one BRR is pending for BPL the MAC entity may do the following for each TTI.

After the step 105, now referring to FIG. 10, in step 108 the UE checks whether the UE's UL beam quality is still acceptable for communication. If not, then in step 109 the UE checks whether the dedicated PRACH is configured for BRR in this TTI. If so, then in step 110, the UE checks whether BRR_COUNTER for BLP I<dbrr-TransMax. If not, then in step 114, the RRC is notified to release PUCCH or dedicated PRACH configured for BRR of BPL i for all serving cells. Then in step 115, the RRC is notified to: release SRS of BPL i for all serving cells; clear any configured downlink assignments and uplink grants; initiate a Random Access procedure on the SpCell and cancel all pending BRRs; notify higher layer that beam failure recovery has failed; and declare out-of-sync, ending the method.

If in step 110 BRR_COUNTER for BLP I<dbrr-TransMax, then in step 111, BRR_COUNTER is incremented by 1 for BLP i. Then in step 112, the UE instructs the physical layer to transmit BRR on one valid dedicated PRACH resource configured for BRR With UL beam sweeping, whose order may be determined by the descending beam quality of candidate beams. In step 113, the UE then starts the brr-ResponseWindow Timer. The method then proceeds to step 130 for the next TTI, after which, in step 116, the UE checks whether a valid beam recovery response is received. If yes, then in step 117, the UE cancels all pending BRRs for BPL i, and the method ends.

If in step 116 a valid beam recovery response is not received, then the method returns to step 108.

If in step 109 the dedicated PRACH is not configured for BRR in this TTI, then in step 118, the UE initiates a random access procedure using the PRACH resources configured (but not dedicated) for BRR of BPL i on the SpCell, and cancels all pending BRRs of BPL i, after which the method ends.

If in step 108 the UE's UL beam quality is still acceptable for communication, then in step 119, the UE checks whether conditions are met for configured PUCCH/dedicated PRACH transmission or Grant-free PUSCH transmission criteria. If conditions are met for configured PUCCH/dedicated PRACH transmission, then in step 120, the UE checks whether the BRR_COUNTER for BLP I<dbrr-TransMax. If so, then in step 121, the BRR_COUNTER for BLP i increment by 1. Then in step 122, the UE instructs the physical layer to signal the BRR on one valid PUCCH resource for BRR, or transmit BRR on one valid dedicated PRACH resource configured for BRR or piggyback the BRR on the scheduled NR-PUSCH. Next, in step 123, the brr-ResponseWindowTimer is started, and the method goes to step 130 for the next TTI.

If in step 120 the BRR_COUNTER for BLP I is not <dbrr-TransMax, then in step 124, the UE notifies RRC to release PUCCH or dedicated PRACH configured for BRR of BPL i for all serving cells. Then in step 125, the UE notifies the RRC to release SRS of BPL i for all serving cells; clear any configured downlink assignments and uplink grants; initiate a Random Access procedure on the SpCell and cancel all pending BRRs; notify higher layer that beam failure recovery has failed; and declare out-of-sync, ending the method.

If in step 119 conditions are met for Grant-free PUSCH transmission, then in step 126, the UE checks whether BRR_COUNTER for BLP i<sbrr-TransMax. If so, then in step 127, the UE increments the BRR_COUNTER for BLP i by 1. Then in step 128, the UE instructs the physical layer to signal the BRR on an available Grant-free NR-PUSCH (if the UE has no user data to transmit), or piggyback the BRR on a Grant-free NR-PUSCH (if the UE has user data to transmit on this Grant-free NR-PUSCH). Next, in step 129, the UE starts the brr-ResponseWindow Timer, and the method proceeds to step 130 for the next TTI.

If in step 126 BRR_COUNTER for BLP i is not <sbrr-TransMax, then the method proceeds to step 125.

If in step 119, conditions are met for neither configured PUCCH/dedicated PRACH transmission nor Grant-free PUSCH transmission criteria, then the method proceeds to step 118.

SR Design

To address Challenge 2, it is generally advantageous to address SR in NR, e.g., according to the following three principles.

First, if no PUCCH resource is configured for SR, the UE may consider grant-free PUSCH first (which may be in this TTI or the next few TTIs if cross-subframe scheduling is used). If no grant-free PUSCH available, SR may use RACH.

Second, if waiting for the PUCCH resource configured for the SR may cause a large delay for the SR and then the data, the UE may choose to use grant-free PUSCH first. Transmission on grant-free PUSCH (data+BSR) may put the current SR on hold (without cancelling it) until ACK/NACK is received for grant-free PUSCH transmission.

Third, UE's SR procedures may use two counters, dsr-TransMax and gsr-TransMax, for PUCCH based SR and grant-free UL-SCH transmission separately.

Detailed SR Procedures

A Scheduling Request (SR) may be used to request UL-SCH resources for a new transmission. When an SR is triggered, it may be considered as pending until it is cancelled. All pending SR(s) may be cancelled and sr-ProhibitTimer may be stopped when a MAC PDU is assembled and this PDU includes a BSR which contains buffer status up to (and including) the last event that triggered a BSR, or if all pending SR(s) are triggered by Sidelink BSR, when a MAC PDU is assembled and this PDU includes a Sidelink BSR which contains buffer status up to (and including) the last event that triggered a Sidelink BSR, or, if all pending SR(s) are triggered by Sidelink BSR, when upper layers configure autonomous resource selection, or when the UL grant(s) may accommodate all pending data available for transmission.

If an SR is triggered and there is no other SR pending, the MAC entity may set the SR_COUNTER to 0.

As long as one SR is pending, the MAC entity may for each TTI, and no UL-SCH resources are available for a transmission in this TTI, the processing may proceed according to whether a valid PUCCH resource is configured for SR.

If the MAC entity has no valid PUCCH resource for SR configured in any TTI, no valid grant-free UL-SCH resources in any TTI, and rach-Skip for the MCG MAC entity or rach-SkipSCG for the SCG MAC entity is not configured, the MAC entity may initiate a Random Access procedure on the SpCell and cancel all pending SRs.

If the MAC entity has at least one valid PUCCH resource for SR configured for this TTI and if this TTI is not part of a measurement gap or Sidelink Discovery Gap for Transmission and if sr-ProhibitTimer is not running, processing may depend upon the SR_COUNTER.

If SR_COUNTER<dsr-TransMax, the MAC entity may: increment SR_COUNTER by one; instruct the physical layer to signal the SR on one valid PUCCH resource for SR; and start the sr-ProhibitTimer.

If SR_COUNTER is not <dsr-TransMax, the MAC entity may: notify RRC to release PUCCH for all serving cells; notify RRC to release SRS for all serving cells; clear any configured downlink assignments and uplink grants; and initiate a Random Access procedure on the SpCell and cancel all pending SRs.

The selection of which valid PUCCH resource for SR to signal SR on when the MAC entity has more than one valid PUCCH resource for SR in one TTI is left to UE implementation.

SR_COUNTER is incremented for each SR bundle. sr-ProhibitTimer is started in the first TTI of an SR bundle.

Figure 11:
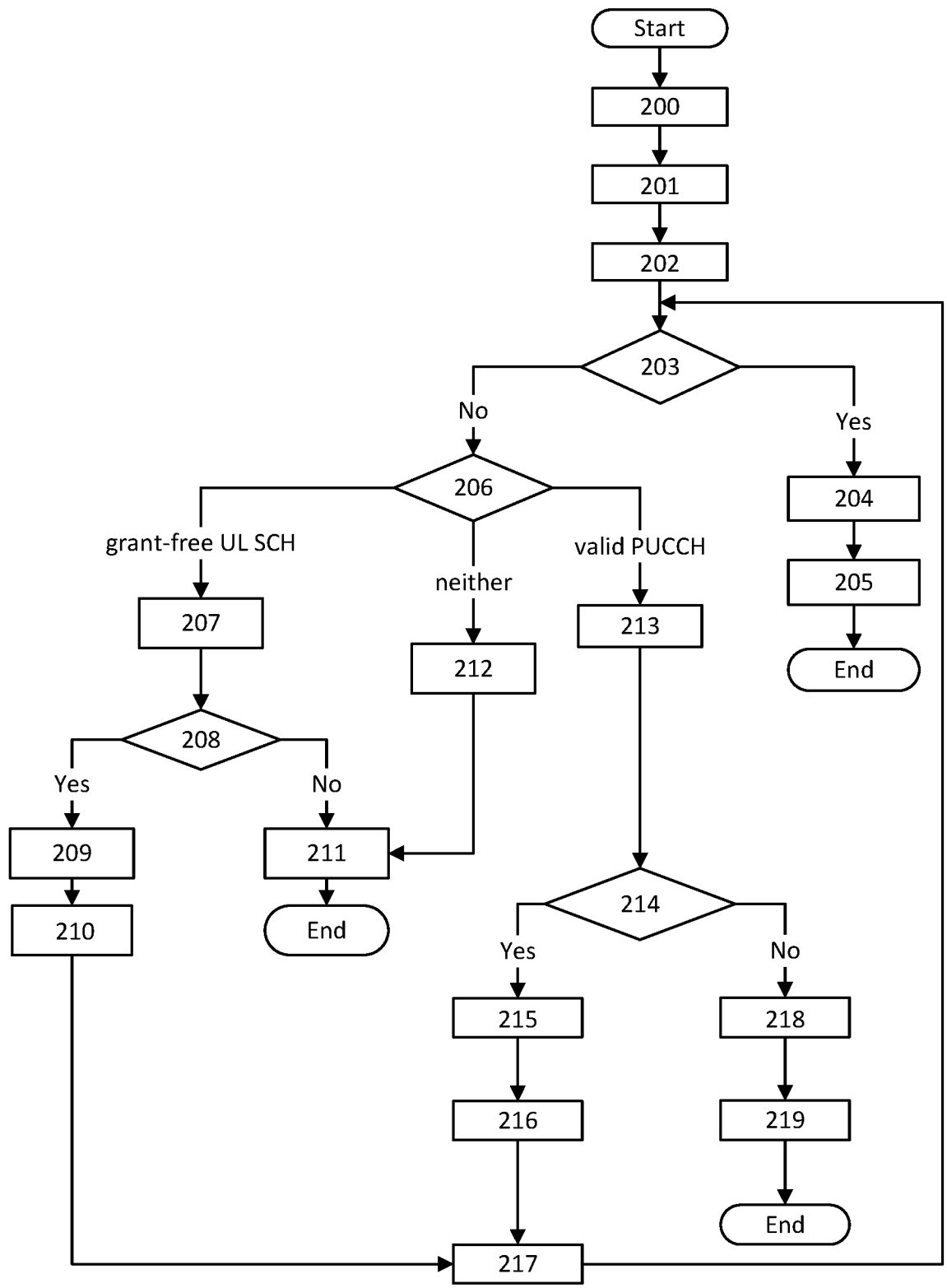
FIG. 11 shows an example scheduling request method.

FIG. 11 shows an example SR procedure. In step 200, an SR is triggered. The SR remains pending until cancelled.

In step 201, if an SR is triggered and there is no other SR pending, the MAC entity may set the SR_COUNTER to 0, and GF_SR_COUNTER to 0.

Beginning at step 202, as long as one SR is pending, the MAC entity performs the rest of the steps for each TTI.

In step 203, the MAC entity checks whether grant-based UL-SCH resources are available for a transmission in this TTI. If so, then in step 204, A MAC PDU is assembled and transmitted on a grant-based UL-SCH. The PDU includes a BSR which contains buffer status up to (and including) the last event that triggered a BSR. Then in step 205, all pending SR(s) may be cancelled and sr-ProhibitTimer may be stopped, and the method ends.

If in step 203 grant-based UL-SCH resources are not available for a transmission in this TTI, then in step 206, the MAC entity checks which SR or data and BSR transmission criteria are met.

If the MAC entity has no valid PUCCH resource for SR configured in any TTI, but has at least one valid grant-free UL-SCH resources in this TTI, or alternatively, if the MAC entity has at least one valid PUCCH resource for SR configured in a later TTI which may cause a large latency, and the user data is latency sensitive (for example, URLLC data), and has at least one valid grant-free UL-SCH resources in this TTI, and if this TTI is not part of a measurement gap or Sidelink Discovery Gap for Transmission and if SR is not on hold, then the method proceeds to step 207. Then in step 208, the MAC entity checks whether the GF_SR_COUNTER<ssr-TransMax. If so, then in step 209, the MAC entity: increments the GF_SR_COUNTER by 1; and instructs the physical layer to transmit user data and BSR on one valid grant-free UL-SCH resource. Next in step 210, the SR is on hold (but not cancelled) until an ACK/NACK is received from the gNB. If an ACK is received, the SR may be cancelled. If a NACK is received, then the SR is back to the pending state, and the method moves onto the next TTI in step 130.

If in step 208, GF_SR_COUNTER is not <ssr-TransMax, then in step 211, the MAC entity initiates a Random Access procedure on the SpCell and cancel all pending SRs, and the method ends.

In step 212, if the MAC entity has no valid PUCCH resource for SR configured in any TTI, no valid grant-free UL-SCH resources in any TTI and if "skipping RACH" is not configured. The method then proceeds to step 211.

In step 213, if the MAC entity has at least one valid PUCCH resource for SR configured for this TTI, and if this TTI is not part of a measurement gap or Sidelink Discovery Gap for Transmission, and if sr-ProhibitTimer is not running, then the methods proceeds to step 214.

In step 214, the Mac entity checks whether the SR_COUNTER<dsr-TransMax. If so, then in step 215, the Mac entity increments SR_COUNTER by 1 and instructs the physical layer to signal the SR on one valid PUCCH resource for SR. Next in step 216, start the sr-ProhibitTimer.

In step 217, the Mac entity processes the next TTI by proceeding back to step 203.

If in step 214 the SR_COUNTER is not <dsr-TransMax, then in step 218 the MAC entity notifies the RRC to: release PUCCH for all serving cells; release SRS for all serving cells; and clear any configured downlink assignments and uplink grants. Then in step 219, the MAC entity initiates a Random Access procedure on the SpCell and cancel all pending SRs.

Interaction between BRR and SRTo address Challenge 2, is advantageous to address the interaction between beam failure recovery and scheduling request procedures. Herein we apply two design principles for beam failure recovery and scheduling request procedures, which may directly impact the NR-PUCCH resources and dedicated PRACH resources allocation for BRR and SR.

Design Principle 1: A triggered beam failure recovery procedure may suspend any pending SR. When the beam failure recovery finishes successfully with a new BPL, then the suspended SR process may be resumed or be reset. Therefore, a BRR should not be transmitted together with a SR at the same time.

Design Principle 2: A triggered beam failure recovery procedure may not suspend any pending SR. Therefore, a BRR may be transmitted together with a SR at the same time.

Resources Allocation and Procedures for Design Principle 1

UL channel resources configured for BRR and SR for Design Principle 1 may take one of the following methods:

Method 1: For each UE, it may be configured one UL channel resources configured commonly for BRR and SR. The maximum amount of information to be carried on this UL channel is determined by the larger one of SR bits and BRR bits. In NR, BRR may use more bits than SR.

Method 2: For each UE, it may be configured two UL channel resources configured for BRR and SR, respectively. The maximum amount of information to be carried on each UL channel is determined by the SR bits and BRR bits, respectively.

BRR and SR Multiplexing Procedures

Upon the event where beam failure recovery criteria for a UE is met, a BRR is triggered and the UE may suspend any pending SR, if any. To be specific, all timers and counters of SR procedures may be suspended. And no SR may be transmitted and optionally no uplink user data+BSR may be transmitted until a valid beam recovery response command is received by the UE and a new BPL is established in UL, DL or both. Then, the UE may resume the SR procedures and associated timers and counters, or reset the SR procedures and associated timers and counters. For resource allocation method 1, BRR and SR may be transmitted on the commonly configured UL channel resources, but not at the same time. For resource allocation Method 2, BRR and SR may be transmitted separately configured UL channel resources, but not at the same time.

Resources Allocation and Procedures for Design Principle 2

UL channel resources configured for BRR and SR for Design Principle 2 may take one of the following methods.

Method 1: For each UE, it may be configured one UL channel resources configured commonly for BRR and SR. The maximum amount of information to be carried on this UL channel is determined by the sum of bits used for SR and BRR.

Method 2: For each UE, it may be configured two UL channel resources configured for BRR and SR, respectively. The maximum amount of information to be carried on both UL channels are determined by the number of bits used by BRR.

BRR and SR Multiplexing Procedures

Upon the event where beam failure recovery criteria for a UE is met, a BRR is triggered and the UE may not suspend any pending SR, if any. Instead, the UE may multiplex BRR and SR, when possible. For resource allocation method 1, the commonly configured UL channel resources may carry either only BRR, only SRR, or both BRR and SR at the same time. The different contents be signaled by a format indicator or may be blindly detected at the gNB. For resource allocation Method 2, when only BRR or SR needs to be transmitted, it may be transmitted on UL channels resource configured for it. When both BRR and SR needs to be transmitted, only BRR bits may be transmitted on UL channels resource configured for SR. Such a transmission may indicate that BRR and SR are transmitted.

Further Enhancements to SR

A scheduling request may fail for a number of reasons. For example, a scheduling request may fail due to loss of DL synchronization or UL synchronization. For example, as per the current LTE specification, PUCCH resources for SR are lost when the UE is no longer synchronized. Similarly, a scheduling request may fail due to interference on the PUCCH resources configured for SR, or due to an incorrect path loss estimation leading to incorrect PUCCH transmit power calculation by the UE.

Any of the reasons above may be specific cell or group of cell dependent but not necessarily to a specific PUCCH resource. For example, the UE maintains synchronization per cell group as dictated by the configured Timing Advance Groups (TAGs). SR failure as a result of PUCCH problem linked to loss of synchronization is likely to be common to all SR PUCCH resources configured in the same group of cells linked to the same TAG. Similarly, SR failure due for e.g. to interference on PUCCH resources or incorrect path loss estimation may likely be cell specific or cell group specific.

Additionally, in NR, the carrier bandwidth of a cell may be configured with more than one BandWidth Part (BWP). SR failure may also be BWP specific.

It is advantageous to define SR failure types and, when the maximum SR transmission counter is reached for an SR configuration, declare a specific SR failure type. SR failure types may include, for example:

SR failures related to SR configuration; SR failures related to BWP where the resources of the failed SR are configured; and SR failures related to the cell where the resources of the failed SR are configured.

The failure type may be hardcoded in the standards. Alternatively, how the UE interprets SR failure with respect to failure type may be configured by the network.

UE Actions Upon SR Failure

The UE may take a number of actions when the SR transmission counter (SR_COUNTER) associated with an SR configuration, reaches the maximum SR transmission (drs-TransMax). For example, the MAC may notify RRC to release PUCCH for the SR configuration of the failed SR. The MAC may notify RRC to release PUCCH for the serving cell where the resources of the failed SR are configured. The MAC may notify RRC to release PUCCH for all serving cells in the timing advance group (TAG) of the serving cell where the resources of the failed SR are configured. The MAC may notify RRC to release PUCCH for the BWP where the resources of the failed SR are configured.

The UE may perform any of the above actions depending on the specified SR failure type or the granularity of the failure type the UE is configured with. For example, the UE make takes the following actions according depending on the specified SR failure type(s) or the SR failure type(s) the UE is configured. If the UE is configured with SR failure type "SR failure specific to SR configuration", the MAC may notify RRC to release PUCCH for the SR configuration of the failed SR.

If the UE is configured with SR failure type "SR failure specific to the cell where the resources of the failed SR are configured", the MAC may notify RRC to release PUCCH for the serving cell where the resources of the failed SR are configured.

If the UE is configured with SR failure type "SR failure specific to the cell where the resources of the failed SR are configured", the MAC may notify RRC to release PUCCH for all serving cells in the timing advance group (TAG) of the serving cell where the resources of the failed SR are configured. For e.g. the UE may take this action if the UE also detects loss of UL synchronization.

If the UE is configured with SR failure type "The MAC may notify RRC to release PUCCH for the BWP where the resources of the failed SR are configured", the MAC notifies RRC to release PUCCH for the BWP where the resources of the failed SR are configured.

Signaling of SR Failure and PUCCH Release to the gNB by the UE

The UE may signal the SR failure and PUCCH release to the gNB using one of the following methods.

RRC Procedure

A new RRC message may be defined for the UE to report the SR failure and request PUCCH release to the network. Such message may be named PUCCHFailureReport, PUCCHStatusReport, PUCCHReestablishment, PUCCHFailureInformation, etc. The message may include an RRC transaction identifier and the SR configuration Index (sr-ConfigIndex). Additionally, the index (sr-PUCCH-ResourceIndex) of the resources used for the failed SR may be included in the message. The UE may send the message on signaling radio bearer SRB1, in RLC AM mode.

Alternatively, the SR failure information and PUCCH release request may be signaled to the gNB using an existing UE to gNB RRC message. Such message may include a new message code, and information elements such as the SR configuration index (sr-ConfigIndex), and the index (sr-PUCCH-ResourceIndex) of the resources used for the failed SR may be included in the message.

MAC Procedure

A RACH procedure may be used to report to the gNB, SR failure and request for PUCCH release. The UE may include the BSR corresponding to the logical channels that triggers the failed SR in the RACH message 3 (Msg3). The gNB implicitly derives from the received BSR, the logical channel and therefore the configuration of the failed SR and the PUCCH to be released.

In another embodiment, the RACH Msg3 may explicitly carry the identifier of the failed SR resources for e.g. the SR configuration Index (sr-ConfigIndex) and/or the index (sr-PUCCH-ResourceIndex) of the resources used for the failed SR. The UE uses this information to inform the gNB of the failed SR and the PUCCH to be released.

In another embodiment, the UE may be configured with association between RACH resources and PUCCH resources for e.g. SR PUCCH resources. The UE transmits RACH message 1 (Msg1) on the RACH resource associated with the PUCCH resource of the failed SR. The gNB identifies the failed PUCCH resources i.e. the failed SR and the PUCCH to be released based on the RACH resources on which the RACH Msg1 is received.

The UE may initiate RACH procedure on the serving cell where the resources of the failed SR is configured. In the existing LTE system however, Random Access procedure on an SCell may only be initiated by a PDCCH order from the eNB. Since the PUCCH resources may be configured on any secondary serving cell, it is advantageous that in NR systems, the UE is allowed to initiate RACH procedure on an SCell i.e. on secondary cell that is not a primary secondary cell for specific reason or when certain criteria are met. For example, when SR failure occurs, the UE may initiate RACH procedure on an SCell to signal SR failure and a request for PUCCH release. The gNB interprets the reception of UE initiated RACH procedure on an SCell (without PDCCH order) as an indication of SR failure and a request for release of PUCCH on that SCell.

For e.g. in one embodiment, UEs may be configured with RACH resources reserved for the signaling of SR failure and/or release of PUCCH resources by the UE to gNB. The gNB first learns of SR failure by the reception of RACH procedure Msg1 on RACH resources reserved for the signaling of SR failure. Upon contention resolution with the reception of RACH procedure Msg5 by the gNB, the gNB identifies the UE that initiates the RACH procedure on an SCell (without PDCCH order), Yet in another embodiment, if the reserved RACH resource for the signaling of SR failure is a RACH resources dedicated to the UE, then the gNB identifies the UE that initiates the RACH procedure on an SCell (without PDCCH order) upon reception of the RACH procedure Msg1.

Enhancements to LCP

Further Enhancements to PBR Handling and Maintenance of Variable Bj

A basic NR time unit (NR-UNIT) of fixed time duration may be considered in support of MAC operation. This basic time unit may be the smallest time resolution at the MAC entity level, and may be regarded as the time interval between system timer interrupts that drives MAC operation. At every NR-UNIT, the MAC entity verifies if there is any pending task to be executed, for e.g. DL grant reception, UL grant reception, DL data reception, UL data transmission including logical channel prioritization, signaling of HARQ feedback, signaling of scheduling request, etc. In NR, the time interval between consecutive data transmission opportunities where an UL grant is available may be variable. We use DTTI to denote that time interval between consecutive data transmission opportunities. Then, DTTI may be expressed in terms of NR UNIT for e.g. DTTI=d*NR-UNIT where the parameter d is a variable integer.

The Logical Channel Prioritization procedure may be used whenever a new transmission is performed.

RRC controls the scheduling of uplink data by signaling for each logical channel per MAC entity: (1) priority where an increasing priority value indicates a lower priority level; (2) prioritisedBitRate which sets the Prioritized Bit Rate (PBR); and (3) bucketSizeDuration which sets the Bucket Size Duration (BSD).

The MAC entity may maintain a variable Bj for each allowed logical channel j according to one of the embodiments described hereinafter.

Embodiment 1 of Maintaining Variable Bj

Bj may be initialized to zero when the related logical channel is established, and incremented by the product PBR×DTTI(j) for each data transmission opportunity on logical channel j, where PBR is Prioritized Bit Rate of logical channel j, and DTTI(j) is the time interval between the last data transmission on logical channel LCH_j and the current data transmission opportunity for logical channel LCH_j. Transmission opportunity for logical channel j is defined as time instant of UL data transmission with a grant that may serve logical channel j. However, the value of Bj may never exceed the bucket size and if the value of Bj is larger than the bucket size of logical channel j, it may be set to the bucket size. The bucket size of a logical channel is equal to PBR×BSD. It is up to UE implementation when to update Bj.

Embodiment 2 of Maintaining Variable Bj

Bj may be initialized to zero when the related logical channel is established, and incremented by the product PBR×DTTI(j) for each data transmission opportunity on logical channel j, where PBR is Prioritized Bit Rate of logical channel j, and DTTI(j) is the time interval between the last data transmission on logical channel LCH_j and the current data transmission opportunity for logical channel LCH_j. Data transmission opportunity for logical channel j is defined as time instant of UL data transmission with a grant where data from logical channel j is actually transmitted using that grant. However, the value of Bj may never exceed the bucket size and if the value of Bj is larger than the bucket size of logical channel j, it may be set to the bucket size. The bucket size of a logical channel is equal to PBR×BSD. It is up to UE implementation when to update Bj.

Further Enhancements to Logical Channel Selection

In support of LCP procedure, logical channels are configured with an allowable latency for which the grant must be within. The allowed latency may be defined by a time interval bounded by Tmin/Tmax combined with a residual HARQ operating point. The residual HARQ operating point may be expressed in terms of a combination of the acceptable average block error rate (BLER) over the expected number of retransmissions in order to achieve the target BLER of the services associated with the logical channel. Since LCP procedure is performed when a new transmission is performed, the residual BLER may be same as the target BLER. At every new transmission, the UE estimates the number of expected retransmissions in order to achieve the target BLER of the services mapped to the logical channel. The target BLER may be the most stringent target BLER i.e. the smallest target BLER value across the services mapped to the logical channel. The UE may scale the allowed lower bound time latency Tmin and the allowed upper bound time latency Tmax by a scaling factor that takes into account the estimated number of retransmissions. More than one scaling factor may be defined where different retransmission numbers are associated with different scaling factors. Furthermore, different scaling factors may be defined for the parameter Tmin and the parameter Tmax. The UE may be configured with scaling factors. Alternatively, scaling factors and mapping to retransmission numbers may be hard coded in the specification. Yet alternatively, the choice of scaling factors and mapping to retransmission numbers may be left to implementation.

During the LCP procedure, the MAC performs the scaling operation on Tmin and Tmax by multiplying the parameter Tmin and the parameter Tmax but the appropriate scaling factors.

From the perspective of latency requirement, the UE MAC determines that the logical channel is allowed to be served by the grant, if the processing timing of the grant is within the allowed scaled latency Tmin and Tmax of the logical channel.

Solution to Challenge 5—Further Enhancements to SR Triggers and Cancellation Rules Solutions that addresses enhancements to SR triggering in scenarios where a BSR is triggered and not cancelled and no UL-SCH resource is available for the transmission of the BSR as exemplified in FIG. 2 and FIG. 3 are captured below.

An UL resource grant r assigned to the UE may be characterized by UL grant assignment time and an UL-assignment-to-UL-data transmission time duration i.e. the total life time of the grant. Alternatively, the UL-assignment-to-UL-data transmission time duration i.e. the total life time of the grant may be broken down in two time intervals i.e. time interval 1 and time interval 2: time interval 1 is the time duration represented by the time lapse UL-assignment-to-UL-data transmission-beginning-time and time interval 2 is the duration of the UL resource grant. Let's denotes k2, the UL-assignment-to-UL-data transmission time duration i.e. the total life time of the grant, K2 the duration or length of the time lapse UL-assignment-to-UL-data transmission-beginning-time and L the duration or length of the UL-SCH grant, then k2=K2+L. Let's denote H the remaining life time of a grant. For a grant r, k2(r) denotes the total life time of the grant, K2(r) may denote the time lapse UL-assignment-to-UL-data transmission-beginning-time, L(r) is the duration of the grant and H(r) is the remaining lifetime of the grant r. The remaining lifetime of the grant r, H(r) may be easily maintained by the MAC by tracking the age of the grant r. Let's denote A(r) the age of grant r. A(r) may be initialized to zero at the time instant when the UE receives the grant r assignment and then incremented appropriately at every UL transmission opportunity by the elapsed time between consecutive UL transmission opportunities. H(r) may then be expressed as H(r)=k2(r)−A(r). Alternatively, H(r) the remaining lifetime of grant may be maintained as follow. H(r) is initialized to the value of k2(r) at the time instant when the UE receives the grant r assignment and then decremented appropriately at every UL transmission opportunity by the elapsed time between consecutive UL transmission opportunities. The units of parameters k2(r), K2(r), L(r), H(r) and A(r) may be expressed in OFDM symbols, NR time slot, mini-slot, a combination of NR time slot and OFDM symbols for e.g. if a transmission start in a middle of a slot, the parameters K2(r) may be expressed as an integer number of time slots plus a fraction of a time slot expressed as an integer number of OFDM symbols that point to the starting symbol of the UL-SCH resource r within the time slot.

It is advantageous to introduce an SR restriction timer logicalChannelSR-Restriction Timer that is used to delay the transmission of an SR that would be triggered immediately otherwise as per the current specification, when a BSR is triggered and have not been cancelled, and there is no UL-SCH resource grant to transmit the BSR as illustrated for example in FIG. 2. The timer logicalChannelSR-Restriction Timer is configured per logical channel. RRC configures the timer to the MAC entity. The unit of the value of the timer may be OFDM symbol, slot or absolute time value for e.g. millisecond or microsecond. Let's denote logicalChannelSR-Restriction TimerDuration, the configured value (i.e. duration) of the timer logicalChannelSR-Restriction Timer.

The MAC entity starts the timer if: (1) a BSR is triggered and not cancelled;
(2) there is no UL-SCH grant available to transmit the BSR during the UL transmission opportunity time internal or the time instant where the BSR is triggered; or (3) there is an UL-SCH grant r assigned to the UE that satisfies the condition logicalChannelSR-Restriction TimerDuration greater or equal to H(r).

The MAC entity cancels the timer logicalChannelSR-RestrictionTimer when the BSR is transmitted. In another alternative embodiment, the MAC entity cancels the timer logicalChannelSR-RestrictionTimer if the data from logical channel LCH2 that triggers the BSR (as illustrated in FIG. 2 or FIG. 3) is transmitted.

Upon expiry of the timer logicalChannelSR-Restriction-Timer, the MAC triggers the SR that was delayed by the setup of this timer. The MAC may use the SR configuration mapped to the logical channel whose data triggers the BSR for which a SR is being triggered.

It is advantageous to modify the buffer status reporting (BSR) procedure as depicted below in support of delaying the triggering of SR when there is an assigned grant, that is not available for use.

RRC may configure the following parameters, for example, to control the BSR: periodicBSR-Timer; retxBSR-Timer; logicalChannelSR-Delay; logicalChannelSR-Delay-Timer; logicalChannelGroup; and
logicalChannelSR-RestrictionTimer.

Each logical channel may be allocated to an LCG using the logicalChannelGroup. The maximum number of LCGs is eight.

The MAC entity determines the amount of UL data available for a logical channel according to the data volume calculation procedure in TSs 38.322 and 38.323.

A BSR may be triggered if the MAC entity has new UL data available for a logical channel which belongs to an LCG, and either the new UL data belongs to a logical channel with higher priority than the priority of any logical channel containing available UL data which belong to any LCG, or none of the logical channels which belong to an LCG contains any available UL data, in which case the BSR is referred below to as 'Regular BSR'.

A BSR may be triggered if UL resources are allocated and number of padding bits is equal to or larger than the size of the Buffer Status Report MAC CE plus its subheader, in which case the BSR is referred below as 'Padding BSR'.

A BSR may be triggered if retxBSR-Timer expires, and at least one of the logical channels which belong to an LCG contains UL data, in which case the BSR is referred below to as 'Regular BSR';

A BSR may be triggered if periodicBSR-Timer expires, in which case the BSR is referred below as 'Periodic BSR'.

For Regular BSR, if the BSR is triggered for a logical channel for which logicalChannelSR-Delay is configured by upper layers, the MAC entity may start or restart the logicalChannelSR-DelayTimer. Otherwise the MAC entity may stop the logicalChannelSR-DelayTimer if it is running.

For Regular and Periodic BSR, if more than one LCG has data available for transmission when the BSR is to be transmitted, the MAC entity may report Long BSR for all LCGs which have data available for transmission. Otherwise, the MAC entity may report Short BSR.

For Padding BSR, if the number of padding bits is equal to or larger than the size of the Short BSR plus its subheader but smaller than the size of the Long BSR plus its subheader, and if more than one LCG has data available for transmission when the BSR is to be transmitted, then if the number of padding bits is equal to the size of the Short BSR plus its subheader, the MAC entity may report Short Truncated BSR of the LCG with the highest priority logical channel with data available for transmission.

For Padding BSR, if more than one LCG has data available for transmission when the BSR is to be transmitted but the number of padding bits is not equal to the size of the Short BSR plus its subheader, then the MAC entity may report Short Truncated BSR of the LCG with the highest priority logical channel with data available for transmission.

For Padding BSR, if the number of padding bits is not equal to or larger than the size of the Short BSR plus its subheader but smaller than the size of the Long BSR plus its subheader, the MAC entity may report Long Truncated BSR of the LCG(s) with the logical channels having data available for transmission following a decreasing order of priority, and in case of equal priority, in increasing order of LCGID.

For Padding BSR, if the number of padding bits is not equal to or larger than the size of the Short BSR plus its subheader but smaller than the size of the Long BSR plus its subheader, the MAC entity may report Short BSR.

For Padding BSR. if the number of padding bits is not equal to or larger than the size of the Short BSR plus its subheader but smaller than the size of the Long BSR plus its subheader, and if the number of padding bits is equal to or larger than the size of the Long BSR plus its subheader, then the MAC entity may report Long BSR for all LCGs which have data available for transmission.

If the Buffer Status reporting procedure determines that at least one BSR has been triggered and not cancelled, then if UL-SCH resources are available for a new immediate transmission the MAC entity may: (1) instruct the Multiplexing and Assembly procedure to generate the BSR MAC CE(s); (2) start or restart periodicBSR-Timer except when all the generated BSRs are long or short Truncated BSRs; (3) start or restart retxBSR-Timer; and (4) stop the logicalChannelSR-RestrictionTimer if running.

If the Buffer Status reporting procedure determines that at least one BSR has been triggered and not cancelled, then if a Regular BSR has been triggered and logicalChannelSR-DelayTimer is not running, the MAC entity may take a number of actions based on conditions. If an uplink grant is not a configured grant or the Regular BSR was not triggered for a logical channel for which logical channel SR masking (logicalChannelSR-Mask) is setup by upper layers, then if the configured value of logicalChannelSR-Restriction Timer is greater than or equal to the remaining life time of a grant already assigned to the UE, the MAC entity may start or restart the timer logicalChannelSR-RestrictionTimer. Otherwise the MAC entity may trigger a Scheduling Request and stop the logicalChannelSR-Restriction Timer if running.

If logicalChannelSR-Restriction Timer expires, the MAC entity may trigger a Scheduling Request.

A MAC PDU may contain at most one BSR MAC CE, even when multiple events have triggered a BSR by the time. The Regular BSR and the Periodic BSR may have precedence over the padding BSR.

The MAC entity may restart retxBSR-Timer upon reception of a grant for transmission of new data on any UL-SCH.

All triggered BSRs may be cancelled when the UL grant(s) may accommodate all pending data available for transmission but is not sufficient to additionally accommodate the BSR MAC control element plus its sub-header. All triggered BSRs may be cancelled when a BSR is included in a MAC PDU for transmission.

The MAC entity may transmit at most one BSR in one MAC PDU. Padding BSR may not be included when the MAC PDU contains a Regular or Periodic BSR.

It is advantageous for scheduling request procedures that, when a MAC PDU is assembled, all pending SRs be cancelled, and each respective sr-ProhibitTimer logicalChannelSR-RestrictionTimer be stopped. The PDU may include a BSR which contains buffer status up to (and including) the last event that triggered a BSR, or when the UL grants may accommodate all pending data available for transmission.

Another issue of interest is when multiple SRs are pending and no SR is sent yet, which SR configuration should be used among the available SR configurations of the pending SRs.

One approach is where SR configurations are prioritized. Here, the MAC entity may determine the priority order based on the SR configuration, to select one or more of: the SR configuration with the most transmission opportunities; the SR configuration with earliest i.e. first transmission opportunity; the SR configuration that corresponds to the highest priority logical channel; and the SR configuration with the long PUCCH format, e.g., where coverage is an issue.

The SR configuration with the short PUCCH format for e.g. if latency is a determining factor.

Alternatively, where SR configurations are not prioritized, each SR may be transmitted using the resource configuration for that SR. Once one of the SR is successful, and the BSR is transmitted, then all remaining pending SRs are cancelled.

Another issue of interest is the following: if random access is initiated due to lack of PUCCH resource to send SR or due to SR transmission reaching maximum allowed transmission, and then a grant becomes available to the UE for example a grant already allocated to the UE becomes available for UL transmission as illustrated in FIG. 2 or FIG. 3, there should be specified criteria for the triggering and the cancelation of the RACH procedure.

Similarly, to the delay of the SR transmission, it is advantageous to delay the RACH procedure.

It is advantageous to use a RACH procedure initiation restriction timer logicalChannelRACH-Restriction Timer that is used to delay the initiation of a RACH procedure that would be triggered immediately otherwise as per the current specification, when there is no PUCCH resource available to transmit an SR or SR transmission has reach the maximum number of scheduling request transmission currently defined by the parameter sr-TransMax per 3GPP TS 38.321 NR Medium Access Control (MAC) protocol specification, V15.0.0. The timer logicalChannelRACH-Restriction Timer is configured per logical channel. RRC configures the timer to the MAC entity. The unit of the timer value may be in OFDM symbol, slot or absolute time value, e.g. millisecond or microsecond. We denote logicalChannelRACH-Restriction TimerDuration, the configured value (i.e., duration) of the timer logicalChannelRACH-RestrictionTimer.

The MAC starts the timer if is triggered and pending and there is no PUCCH resource available for the SR transmission, or the number of SR transmissions reach the maximum number of SR repetitions currently defined by the parameter sr-TransMax per 3GPP TS 38.321 NR Medium Access Control (MAC) protocol specification, V15.0.0.

The MAC starts also the timer if there is an UL-SCH grant r assigned to the UE that satisfies the condition logicalChannelRACH-RestrictionTimerDuration greater or equal to H(r).

The MAC entity cancels the timer logicalChannelRACH-Restriction Timer when the BSR is transmitted using the UL-SCH resource grant r. In another alternative embodiment, the MAC entity cancels the timer logicalChannel-RACH-Restriction Timer if the data from logical channel LCH2 that triggers the BSR (as illustrated in FIG. 2 or FIG. 3), is transmitted using the UL-SCH grant r.

Upon expiry of the timer logicalChannelRACH-RestrictionTimer, the MAC triggers the RACH procedure that was delayed by the setup of this timer.

As for the cancellation of the RACH procedure, it is advantageous to cancel a RACH procedure triggered by SR if PUCCH resource become available for the transmission of the SR or an UL-SCH resource for the BSR transmission becomes available before the Random Access Response (RAR) message is received by the UE.

Solution to Problem 6—Further Enhancements to Buffer Status Calculation

Solutions addressing buffer status calculation in the presence of two or more overlapping UL-SCH resource grants are discussed hereinafter.

Figure 4:
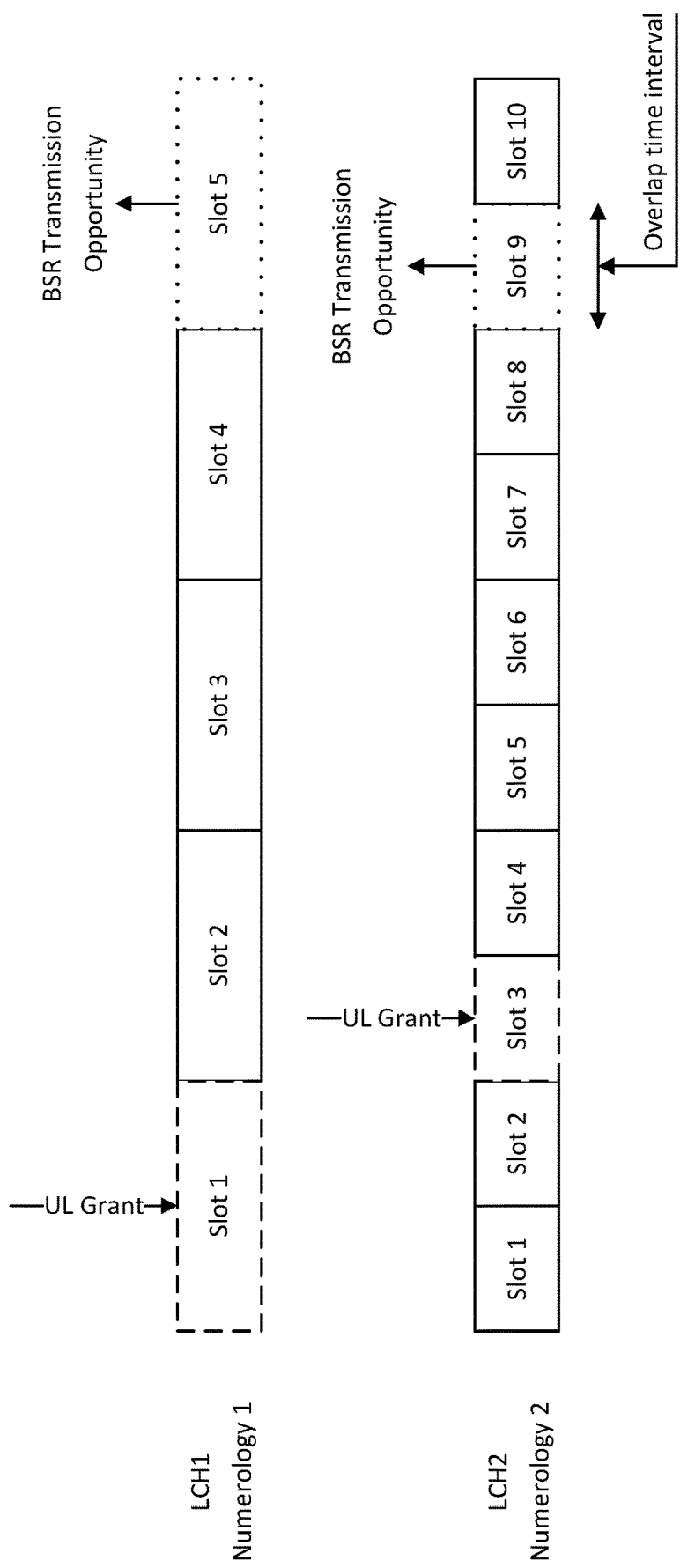
FIG. 4 illustrates a first buffer status determination example.
Figure 5:
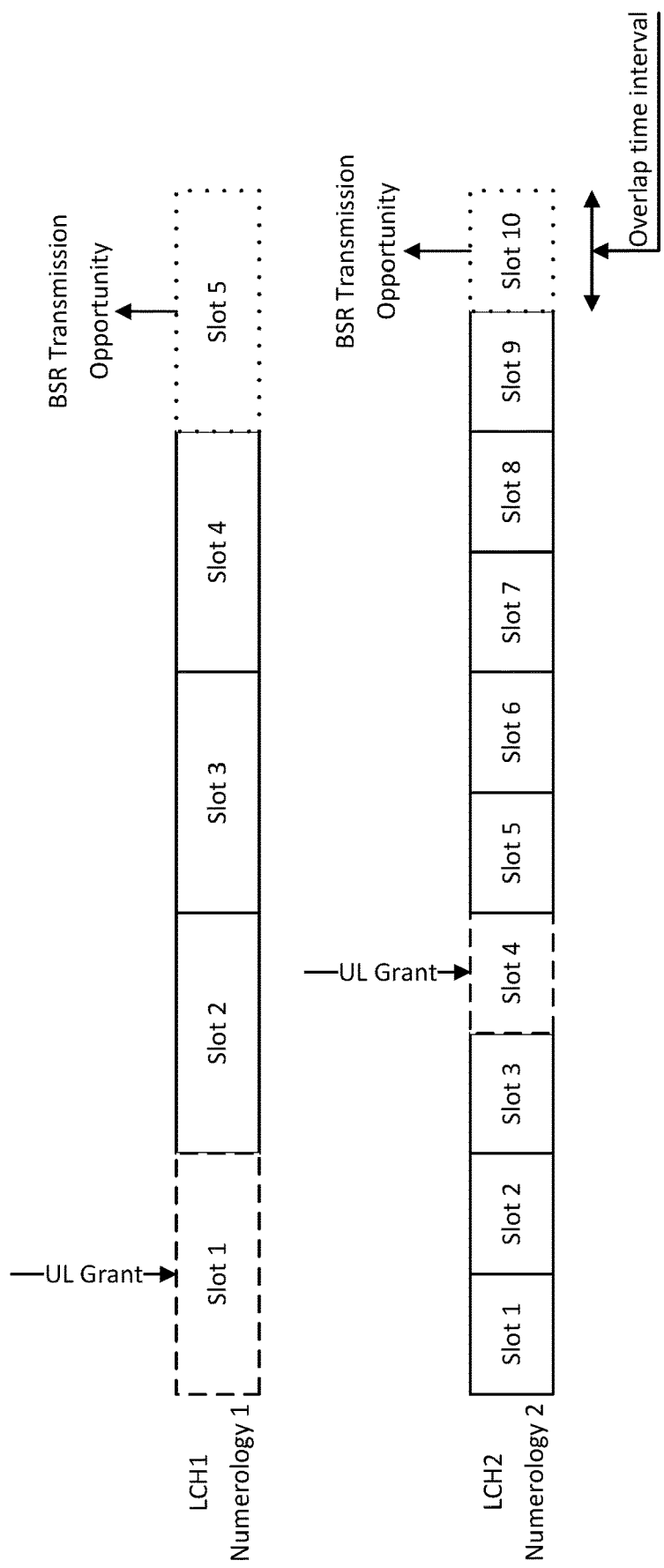
FIG. 5 illustrates a second buffer status determination example.
Figure 6:
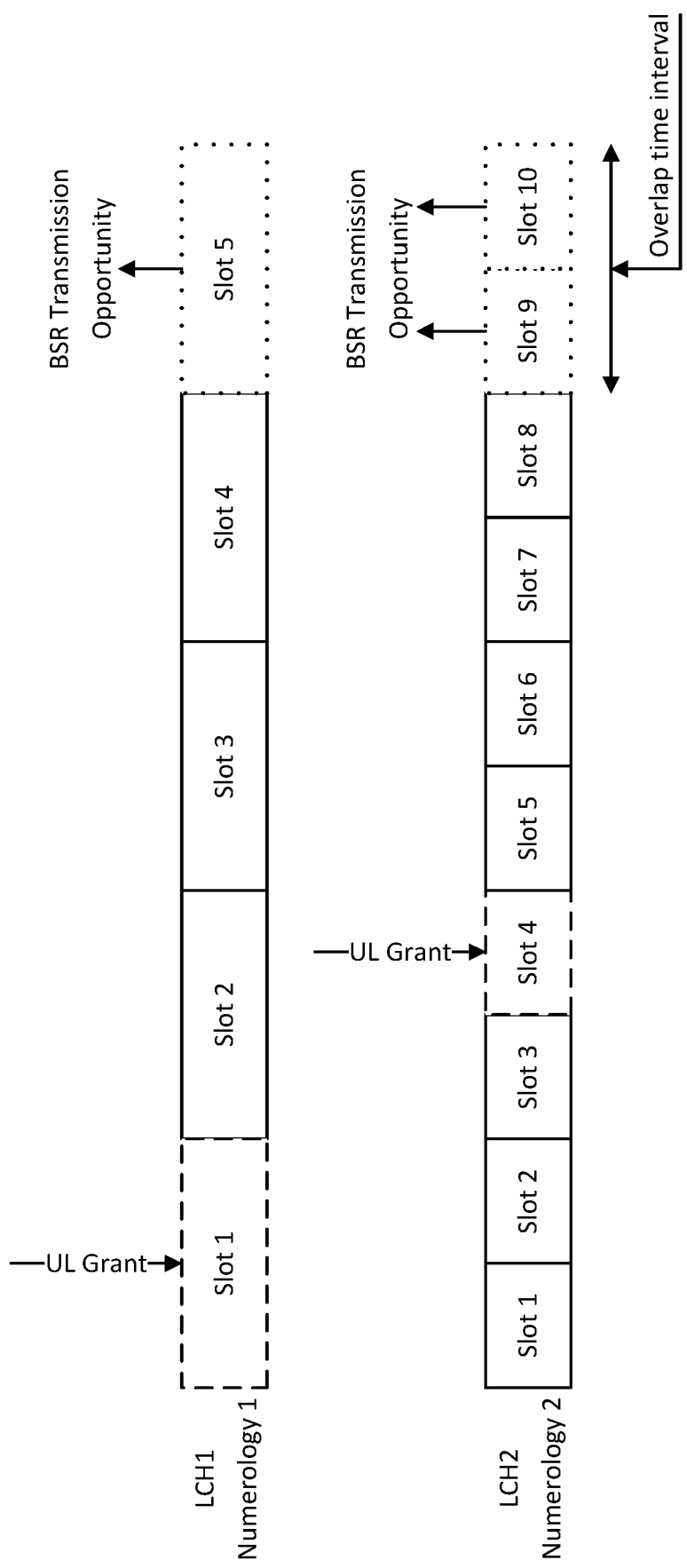
FIG. 6 illustrates a third buffer status determination example.

The resource grants calculation examples illustrated in FIGS. 4-8 may be characterized by one or more of the following key attributes relevant for buffer status determination In Case 1, the UL data transmission times of the grants overlap and end at the same time (e.g., in FIG. 5 or FIG. 6 when UL transmission of LCH2 is in time slot 10).

Figure 7:
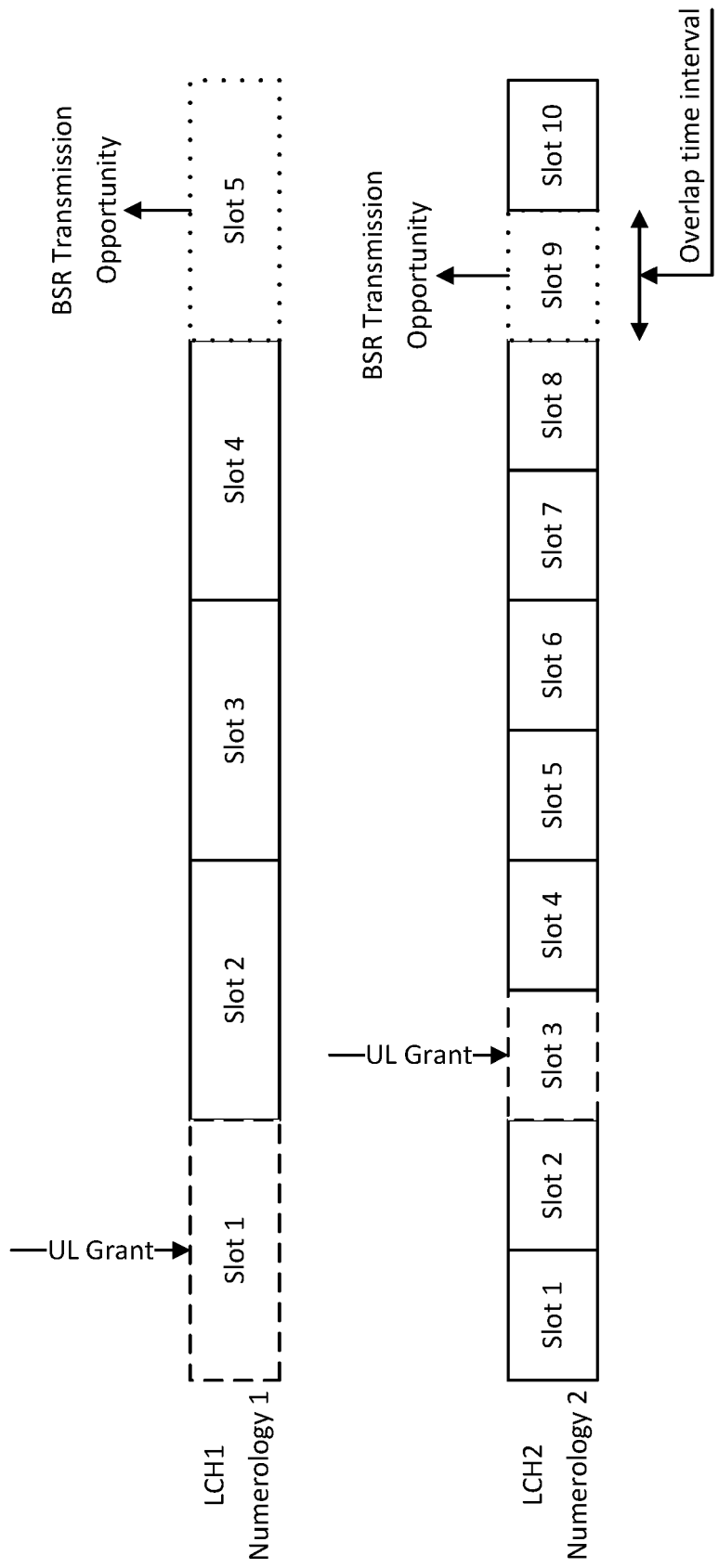
FIG. 7 illustrates a fourth buffer status determination example.

In Case 2, the UL data transmission times of the grants overlap and do not end at the same time (e.g., in FIG. 4, FIG. 6, or FIG. 7 when UL transmission of LCH2 is in time slot 9).

Figure 8:
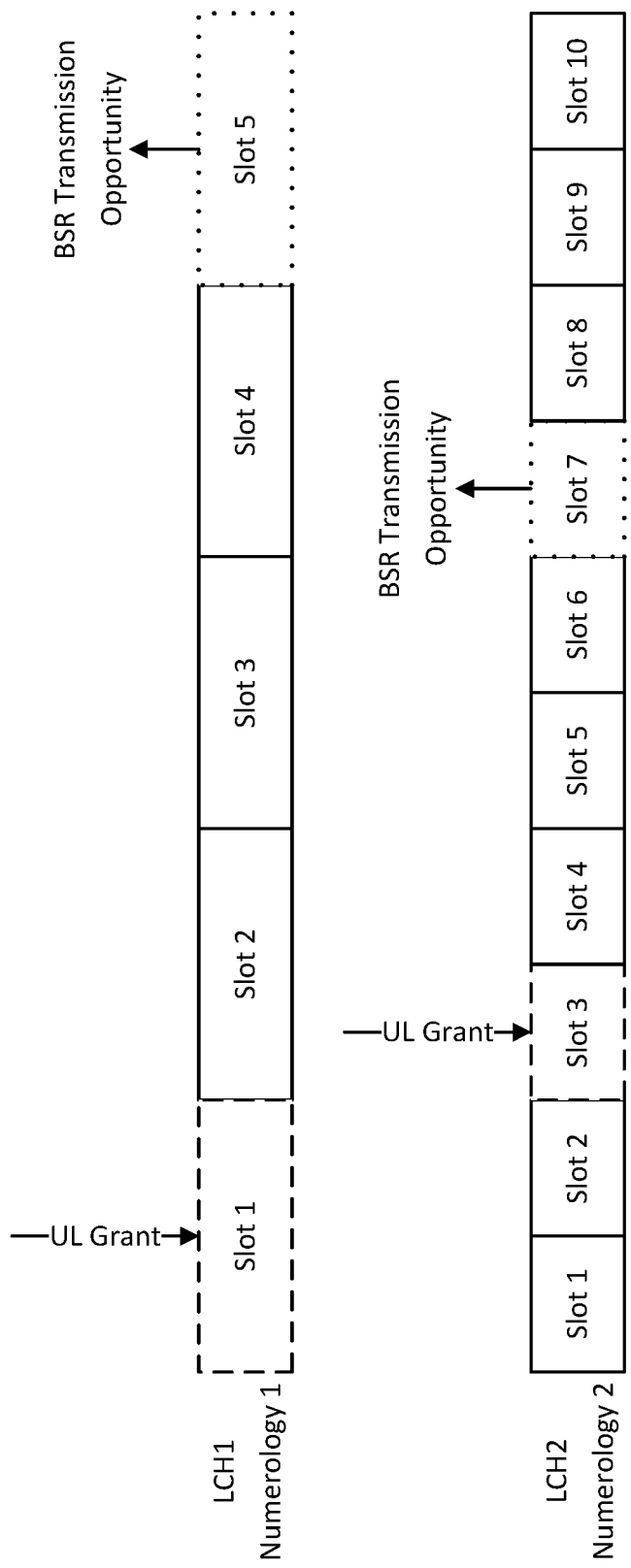
FIG. 8 illustrates a fifth buffer status determination example.

In Case 3, the UL data transmission times of the grants don't overlap, but the time interval starting from the time the grant is assigned to the UE to the time the grant is used for transmission by the UE overlaps between the grants (e.g., in FIG. 8).

Case 1

In Case 1, the UL data transmission times of the grants overlap and end at the same time. The following rules are proposed for the determination of the buffer status and the grant to be used for the BSR.

Since the UL data transmission times of the grants end at the same time, it is advantageous that the MAC entity determines the buffer status taking into count all remaining data in MAC transmission buffers after all the available UL-SCH grants are exhausted. As for the grant(s) to be used for the transfer of the BSR, it proposed that the MAC entity determines the distribution of the BSR among the grants, so as to maximize the use of the radio air interface resources. Accordingly, the BSR may be transmitted with one single grant. In another alternatively the MAC entity may split the BSR across the available UL grants, i.e. for example in the case of two overlapping grants, the BSR may be split in two BSRs where one of the two BSRs is transmitted over one of the two grants and the second BSR is transmitted over the other grant. It should be understood that the term or expression "split a BSR into more than one BSR for example two BSRs" is used in this document to say the following: the MAC entity calculates or determines a buffer status and constructs more than one BSR using the determined buffer status, and the sum of all the buffer sizes across all the constructed BSRs is equal to the size of the buffer status being split into multiple BSRs.

The LCGs to include in each of the BSRs may depend on the priority of the UL grants. For example, if we consider the case where two UL grants are available and grant 1 is of higher priority than grant 2, then the BSR transmitted using grant 1 may include buffer status information for LCGs with a priority that is greater than or equal to the priority of grant 1; and the BSR transmitted using grant 2 may include buffer status information for the remaining LCGs; i.e. LCGs with a priority that is lower than the priority of grant 1.

This method may be extended for the more general case where N grants are available. For illustrative purposes, we may assume the grants are numbered in order of priority, with UL grant 1 being the highest priority grant and UL grant N the lowest priority grant. The BSR transmitted using UL grant 1 would include buffer status information for LCGs where:

Priority($LCG_i$)≥Priority($grant_1$);

and the BSR transmitted using UL grant n, where 1<n<N, would include buffer status information for LCGs where:

Priority($grant_{n-1}$)>Priority($LCG_i$)>Priority($grant_n$);

and the BSR transmitted using grant N would include buffer status information for LCGs where:

Priority($LCG_i$)<Priority($grant_{N-1}$).

The priority of an LCGi in this context may be defined as the priority of the logical channel of highest priority with data available for transmission, in LCGi.

The priority of a grant may be defined in reference to the SubCarrier Spacing (SCS) of the numerology associated with grant. For example grants may be prioritized according to the values of their SCS, where the higher is the value of the SCS, the higher is the priority of the grant.

The assignment of BSR to grant may be done according to the following rule: if the priority of LCGi is equal or greater than the priority of LCGj, then the buffer information of LCGi should be transmitted on a grant with equal or higher priority than the grant carrying the buffer information of LCGj.

Case 2

In Case 2, the UL data transmission times of the grants overlap and do not end at the same time.

In one embodiment, it proposed in this case, that the MAC entity determines the buffer status as all available data in the MAC transmission buffers after the grant with the UL transmission time that ends last is exhausted. In this case, the MAC entity transmits only one BSR and that BSR is transmitted with the UL-SCH grant whose transmission time ends last. The rational of this proposal is that the duration of the UL transmission across all the overlapping grant is the time lapse between the beginning of UL transmission with the resource grant whose UL transmission begin first, and the end of the UL transmission with the resource grant whose UL transmission ends last. Therefore, a different mechanism but similar to the legacy LTE system for example is to have the MAC entity determines the buffer status as all available data in the MAC transmission buffers after the grant with the UL transmission time that ends last is exhausted, and transmits the BSR with the UL-SCH grant whose transmission time ends last.

Another alternative embodiment is to have MAC entity determines the buffer status as all available data in the MAC transmission buffers at the end of each UL transmission time for each grant, and transmit the corresponding buffer status report using that grant. This might be somewhat a little bit inefficient as buffer status are over reported which also implies unnecessary use of air interface radio resource for unnecessary buffer status reporting or larger buffer status reporting than required, since there are pending resources grants in the UE that may subsequently be use for transmission of some of the data or all the data being reporting as part of the BSR. However, it is a feasible approach to buffer status determination and reporting. It should also be noted that this approach may not necessarily result in gNB overallocating UL resource grants to the UE since the gNB is aware of all the pending UL resource grants at the UE i.e. UL resource grants assigned to the UE and which are yet to be used for UL data transmission by the UE. In this scheme, when the gNB received a BSR from the UE, the gNB is aware of buffer status over reporting and may avoid assigning UL grants for the portion of the buffer status that is over-reported. In this embodiment, more than one BSR may be transmitted.

Another alternative embodiment is to have MAC entity determines the buffer status as all available data in the MAC transmission buffers at the end of each UL transmission time for each grant, minus an estimation of data that may be transmitted with the remaining grants whose transmission time end later, and transmit the corresponding buffer status report using that grant. In this embodiment, more than one BSR may be transmitted.

In yet another alternative, it proposed that the MAC entity determines the buffer status as all available data in the MAC transmission buffers after the grant with the UL transmission time that ends first is exhausted. In this case, the MAC entity transmits only one BSR and that BSR is transmitted with the UL-SCH grant whose transmission time ends first. Alternatively, for the estimation of the buffer status, the MAC entity determines the buffer status as all available data in the MAC transmission buffers after the grant with the UL transmission time that ends first is exhausted minus an estimation of the data that may be transmitted with the remaining grants.

Case 3

In Case 3, the UL data transmission times of the grants don't overlap, but the time interval starting from the time the grant is assigned to the UE to the time the grant is used for transmission by the UE overlaps between the grants.

In one embodiment, it is advantageous that MAC entity determines the buffer status as all available data in the MAC transmission buffers after the grant with the UL transmission time that ends first is exhausted. The MAC entity transmits only one BSR and that BSR is transmitted with the grant whose UL transmission time ends first.

In an alternative embodiment, it is advantageous that the buffer status is determined as all available data in MAC transmission buffer after the grant with the UL transmission time that ends first is exhausted, minus an estimation of data that may be transmitted with the remaining non-overlapping grants whose transmission time begins after the grant with UL transmission time that ends first is exhausted. The MAC entity transmits only one BSR and that BSR is transmitted using the grant whose UL transmission time ends first.

In another embodiment, it is advantageous that MAC entity determines the buffer status as all available data in the MAC transmission buffers after the grant with the UL transmission time that ends last is exhausted. The MAC entity transmits only one BSR and that BSR is transmitted with the grant whose UL transmission time ends last.

In yet another alternative embodiment, it is advantageous that the buffer status is determined as all available data in MAC transmission buffer after the grant with the UL transmission time that ends first is exhausted, The MAC entity transmits only one BSR and that BSR is transmitted using the grant whose UL transmission time ends first.

In another alternative embodiment, it is advantageous that the transmission of a BSR that is triggered and not cancelled, may be delayed and transmitted in subsequent grant, i.e. MAC entity is allowed to skip BSR transmission opportunity. It is advantageous to introduce a BSR restriction timer logicalChannelBSR-RestrictionTimer that is used to delay the transmission of an SR that would have been otherwise triggered immediately otherwise. The timer logicalChannelBSR-RestrictionTimer is configured per MAC entity. RRC configures the timer to the MAC entity. The unit of the value of the timer may be OFDM symbol, slot, mini-slot or absolute time value for e.g. millisecond or microsecond. Let's denote logicalChannelBSR-Restriction TimerDuration, the configured value (i.e. duration) of the timer logicalChannelBSR-Restriction Timer.

The MAC delays BSR transmission and starts the timer logicalChannelBSR-Restriction Timer if either (1) a BSR is triggered and not cancelled, or (2) there is an UL-SCH grant r assigned to the UE that satisfies the condition logicalChannelBSR-Restriction TimerDuration greater or equal to H(r).

The MAC entity cancels the timer logicalChannelBSR-RestrictionTimer when the BSR is transmitted. In another alternative embodiment, the MAC entity cancels the timer logicalChannelBSR-RestrictionTimer if the data that triggers the BSR is transmitted.

Upon expiry of the timer logicalChannelBSR-RestrictionTimer, the MAC triggers a BSR.

It should be noted that this alternative embodiment may also apply to overlapping grants case 2 example described above.

Further Enhancements to SR are described herein. SRs may fail for a number of reasons, including but not limited to the following: loss of DL synchronization or UL synchronization (for example, as per the LTE specification, PUCCH resources for an SR are lost when the UE is no longer synchronized); interference on the PUCCH resources configured for SR; and incorrect path loss estimation leading to incorrect PUCCH transmit power calculation by the UE. Any of the reasons above may be dependent on a specific cell or group of cells but not necessarily to a specific PUCCH resource. For example, the UE may maintain synchronization per cell group as dictated by the configured Timing Advance Groups (TAGs). An SR failure as a result of a PUCCH problem linked to a loss of synchronization is likely to be common to all SR PUCCH resources configured in the same group of cells linked to the same TAG. Similarly, an SR failure due, for example, to interference on PUCCH resources or incorrect path loss estimation is likely specific to a cell or cell group.

Additionally, in NR, the carrier bandwidth of a cell may be configured with more than one Bandwidth Part (BWP). An SR failure may also be BWP specific.

It is therefore proposed to define SR failure types and to declare a specific SR failure type when the maximum SR transmission counter is reached for an SR configuration. The following SR failure types may be considered: an SR failure specific to SR configuration; an SR failure specific to BWP where the resources of the failed SR are configured; and an SR failure specific to the cell where the resources of the failed SR are configured. The failure type may be hardcoded in the standards. In an alternative embodiment, how the UE interprets SR failure with respect to failure type is configurable by the network.

UE actions upon SR failure are described herein. The UE may take one of the following actions when the SR transmission counter (SR_COUNTER) associated with an SR configuration, reaches the maximum SR transmission (drs-TransMax): the MAC notifies the RRC to release PUCCH for the SR configuration of the failed SR; the MAC notifies the RRC to release PUCCH for the serving cell where the resources of the failed SR are configured; the MAC notifies the RRC to release PUCCH for all serving cells in the timing advance group (TAG) of the serving cell where the resources of the failed SR are configured; and the MAC notifies the RRC to release PUCCH for the BWP where the resources of the failed SR are configured. The UE may perform any of the above actions depending on the specified SR failure type or the granularity of the failure type with which the UE is configured. For example, the UE may take the following actions depending on the specified SR failure type(s) or the SR failure type(s) the UE is configured with as follows: if the UE is configured with SR failure type "SR failure specific to SR configuration," the MAC may notify the RRC to release the PUCCH for the SR configuration of the failed SR; if the UE is configured with SR failure type "SR failure specific to the cell where the resources of the failed SR are configured," the MAC may notify the RRC to release the PUCCH for the serving cell where the resources of the failed SR are configured; if the UE is configured with SR failure type "SR failure specific to the cell where the resources of the failed SR are configured," the MAC may notify the RRC to release the PUCCH for all serving cells in the timing advance group (TAG) of the serving cell where the resources of the failed SR are configured (for example, the UE may take this action if the UE also detects loss of UL synchronization); and if the UE is configured with SR failure type "The MAC notifies RRC to release PUCCH for the BWP where the resources of the failed SR are configured," the MAC may notify the RRC to release the PUCCH for the BWP where the resources of the failed SR are configured.

Signaling of SR failure and PUCCH release to the gNB by the UE is described herein. The UE may signal the SR failure and the PUCCH release to the gNB using one of the following methods.

An RRC procedure is described herein. A new RRC message may be defined for the UE to report the SR failure and request PUCCH release to the network. Such a message may be named PUCCHFailureReport, PUCCHStatusReport, PUCCHReestablishment, PUCCHFailureInformation, etc. The message may include an RRC transaction identifier and the SR configuration Index (sr-ConfigIndex). Additionally, the index (sr-PUCCH-ResourceIndex) of the resources used for the failed SR may be included in the message. The UE may send the message on a signaling radio bearer SRB1, in RLC AM mode. Alternatively, the SR failure information and PUCCH release request may be signaled to the gNB using an existing UE to gNB RRC message. Such a message may include a new message code, and information elements such as the SR configuration index (sr-ConfigIndex), and the index (sr-PUCCH-ResourceIndex) of the resources used for the failed SR may be included in the message.

A MAC procedure is described herein. A RACH procedure may be used to report to the gNB, an SR failure and request for PUCCH release. The UE may include the BSR corresponding to the logical channels that triggers the failed SR in the RACH message 3 (Msg3). The gNB may implicitly derive from the received BSR, the logical channel and therefore the configuration of the failed SR and the PUCCH to be released.

In another embodiment, the RACH Msg3 may explicitly carry the identifier of the failed SR resources, for example, the SR configuration Index (sr-ConfigIndex) and/or the index (sr-PUCCH-ResourceIndex) of the resources used for the failed SR. The UE may use this information to inform the gNB of the failed SR and the PUCCH to be released.

In another embodiment, the UE may be configured with an association between RACH resources and PUCCH resources, for example, SR PUCCH resources. The UE may transmit RACH message 1 (Msg1) on the RACH resource associated with the PUCCH resource of the failed SR. The gNB identifies the failed PUCCH resources i.e. the failed SR and the PUCCH to be released based on the RACH resources on which the RACH Msg1 is received.

The UE may initiate a RACH procedure on the serving cell where the resources of the failed SR is configured. In the LTE system however, the random access procedure on a Secondary Cell (SCell) may only be initiated by a PDCCH order from the eNB. Since the PUCCH resources may be configured on any secondary serving cell, it is advantageous that in NR systems, the UE be allowed to initiate a RACH procedure on an SCell for a specific reason(s) or when certain criteria are met. For example, when an SR failure occurs, the UE may initiate the RACH procedure on an SCell to signal an SR failure and a request for PUCCH release. The gNB may interpret the reception of a UE initiated RACH procedure on an SCell (without PDCCH order) as an indication of an SR failure and a request for release of PUCCH on that SCell.

For example, in one embodiment, UEs may be configured with RACH resources reserved for the signaling of an SR failure and/or release of PUCCH resources by the UE to the gNB. The gNB may first learn of an SR failure by the reception of RACH procedure Msg1 on RACH resources reserved for the signaling of the SR failure. Upon contention resolution with the reception of the RACH procedure Msg5 by the gNB, the gNB may identify the UE that initiates the RACH procedure on an SCell (without PDCCH order). In yet another embodiment, if the reserved RACH resource for the signaling of the SR failure is a RACH resource dedicated to the UE, then the gNB may identify the UE that initiates the RACH procedure on an SCell (without PDCCH order) upon reception of the RACH procedure Msg1.

Enhancements to LCP are described herein, which may include further enhancements to PBR handling and maintenance of variable Bj. A basic NR time unit (NR-UNIT) of fixed time duration may be considered in support of MAC operation. This basic time unit may be the smallest time resolution at the MAC entity level, and may be regarded as the time interval between system timer interrupts that drive MAC operation. At every NR-UNIT, the MAC entity may verify whether there is any pending task to be executed such as, for example, DL grant reception, UL grant reception, DL data reception, UL data transmission including logical channel prioritization, signaling of HARQ feedback, signaling of scheduling request, etc. In NR, the time interval between consecutive data transmission opportunities where an UL grant is available may be variable. A DTTI may be used to denote that time interval between consecutive data transmission opportunities. A DTTI may be expressed in terms of NR UNIT, for example, DTTI=d*NR-UNIT where the parameter d is a variable integer.

The Logical Channel Prioritization procedure may be applied whenever a new transmission is performed.

RRC may control the scheduling of uplink data by signaling for each logical channel per MAC entity: priority where an increasing priority value indicates a lower priority level; prioritisedBitRate which sets the Prioritized Bit Rate (PBR); and bucketSizeDuration which sets the Bucket Size Duration (BSD).

The MAC entity may maintain a variable Bj for each allowed logical channel j according to one of the embodiments described herein.

In one embodiment for maintaining the variable Bj, the variable Bj may be initialized to zero when the related logical channel is established, and incremented by the product PBR×DTTI(j) for each data transmission opportunity on logical channel j, where PBR is Prioritized Bit Rate of logical channel j, and DTTI(j) is the time interval between the last data transmission on logical channel LCH_j and the current data transmission opportunity for logical channel LCH_j. A transmission opportunity for logical channel j may be defined as a time instant of an UL data transmission with a grant that may serve logical channel j. However, the value of Bj may never exceed the bucket size and if the value of Bj is larger than the bucket size of logical channel j, it may be set to the bucket size. The bucket size of a logical channel may be equal to PBR×BSD. It is up to the UE implementation when to update Bj.

In another embodiment for maintaining the variable Bj, the variable Bj may be initialized to zero when the related logical channel is established, and incremented by the product PBR×DTTI(j) for each data transmission opportunity on logical channel j, where PBR is Prioritized Bit Rate of logical channel j, and DTTI(j) is the time interval between the last data transmission on logical channel LCH_j and the current data transmission opportunity for logical channel LCH_j. A data transmission opportunity for logical channel j may be defined as a time instant of an UL data transmission with a grant where data from logical channel j is actually transmitted using that grant. However, the value of Bj may never exceed the bucket size and if the value of Bj is larger than the bucket size of logical channel j, it may be set to the bucket size. The bucket size of a logical channel is equal to PBR×BSD. It is up to UE implementation when to update Bj.

Further enhancements to Logical Channel Selection are described herein. In support of the LCP procedure, logical channels may be configured with an allowable latency for which the grant must be within. The allowed latency may be defined by a time interval bounded by Tmin/Tmax combined with a residual HARQ operating point. The residual HARQ operating point may be expressed in terms of a combination of the acceptable average block error rate (BLER) over the expected remaining number of retransmissions in order to achieve the target BLER of the services associated with the logical channel. Since the LCP procedure is performed when a new transmission is performed, the residual BLER may be same as the target BLER. At every new transmission, the UE may estimate the number of expected retransmissions in order to achieve the target BLER of the services mapped to the logical channel. The target BLER may be the most stringent target BLER i.e. the smallest target BLER value across the services mapped to the logical channel. The UE may scale the allowed lower bound time latency Tmin and the allowed upper bound time latency Tmax by a scaling factor that takes into account the estimated number of retransmissions. More than one scaling factor may be defined where different retransmission numbers are associated with different scaling factors. Furthermore, different scaling factors may be defined for the parameter Tmin and the parameter Tmax. The UE may be configured with scaling factors. Alternatively, scaling factors and mapping to retransmission numbers may be hard coded in the specification. Yet alternatively, the choice of scaling factors and mapping to retransmission numbers may be left to implementation.

During the LCP procedure, the MAC may perform the scaling operation on Tmin and Tmax by multiplying the parameter Tmin and the parameter Tmax by the appropriate scaling factors.

From the perspective of latency requirements, the UE MAC may determine that the logical channel is allowed to be served by the grant, if the processing timing of the grant is within the allowed scaled latency Tmin and Tmax of the logical channel.

In another embodiment, the grant may be associated with a processing latency bounded by a time interval Tmin(grant) and Tmax(grant). At every new transmission, the UE may estimate the number of expected retransmissions in order to achieve the target BLER of the services mapped to an allowed logical channel. The target BLER may be the most stringent target BLER, i.e. the smallest target BLER value across the services mapped to the logical channel. The UE may scale the lower bound processing latency Tmin(grant) of the grant and the upper bound processing latency Tmax (grant) of the grant by scaling factor(s) that take into account the estimated number of retransmissions. More than one scaling factor may be defined where different retransmission numbers are associated with different scaling factors. Furthermore, different scaling factors may be defined for the parameter Tmin(grant) and the parameter Tmax(grant). The UE may be configured with scaling factors. Alternatively, scaling factors and mapping to retransmission numbers may be hard coded in the specification. In yet another alternative, the choice of scaling factors and mapping to retransmission numbers may be left to implementation.

During the LCP procedure, the MAC may perform the scaling operation on Tmin(grant) and Tmax(grant) by multiplying the parameter Tmin(grant) and the parameter Tmax (grant) by the appropriate scaling factors.

From the perspective of latency requirements, the UE MAC may determine that the logical channel is allowed to be served by the grant, if the allowed latency of the logical channel is within the grant processing latency Tmin(grant) and Tmax(grant).

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 12:
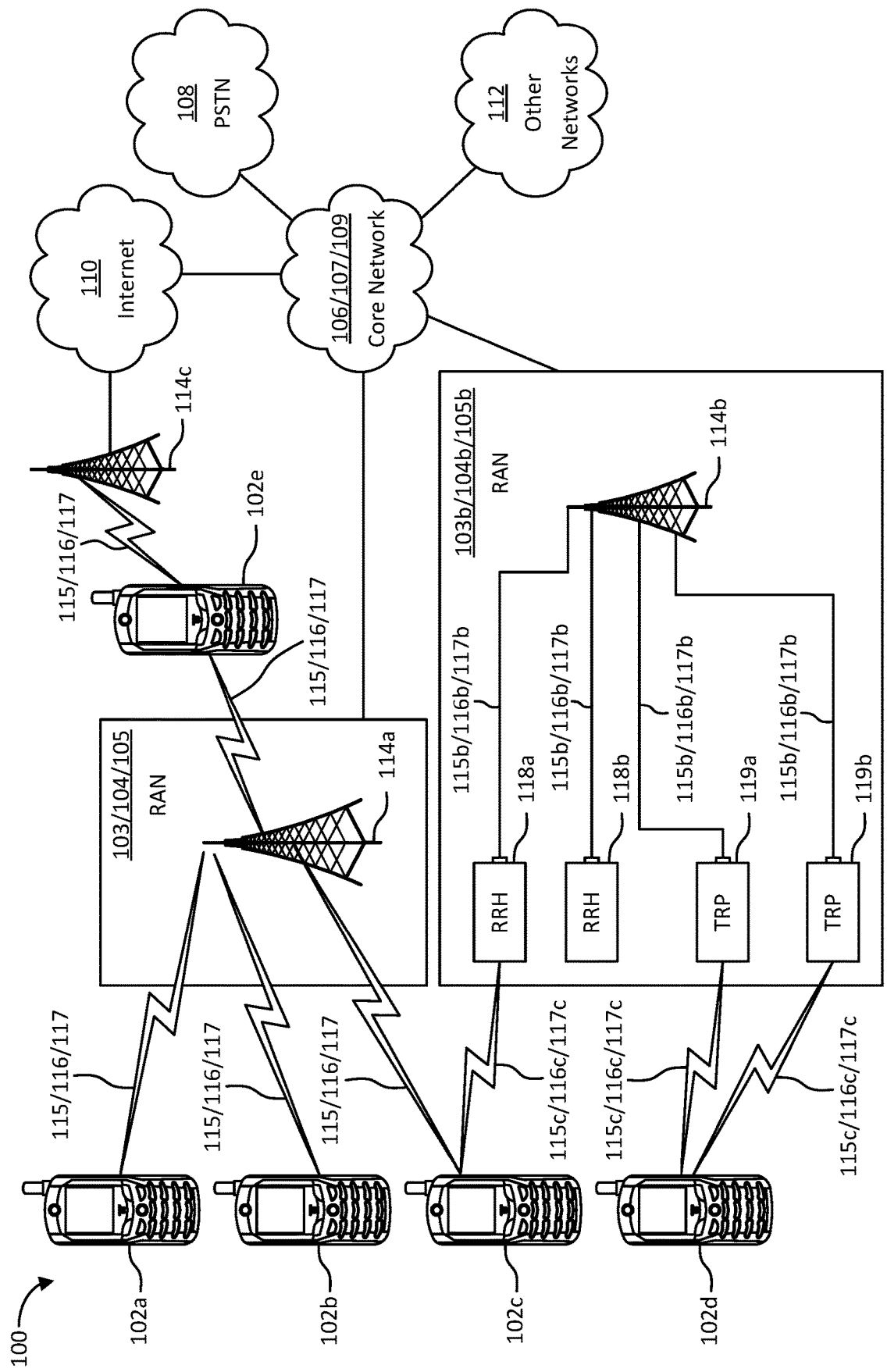
FIG. 12 illustrates an example communications system.

FIG. 12 illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, and/or 102*d* (which generally or collectively may be referred to as WTRU 102), a radio access network (RAN) 103/104/105/103*b*/104*b*/105*b*, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d*, 102*e* may be any type of apparatus or device configured to operate and/or communicate in a wireless environment. Although each WTRU 102*a*, 102*b*, 102*c*, 102*d*, 102*e* is depicted in FIGS. 66-8 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, and 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b* and/or TRPs (Transmission and Reception Points) 119*a*, 119*b* to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 12 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 12, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 12, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 12 may be configured to communicate with the base station 114a, which may employ a cellular-based radio technology, and with the base station 114c, which may employ an IEEE 802 radio technology.

Figure 13:
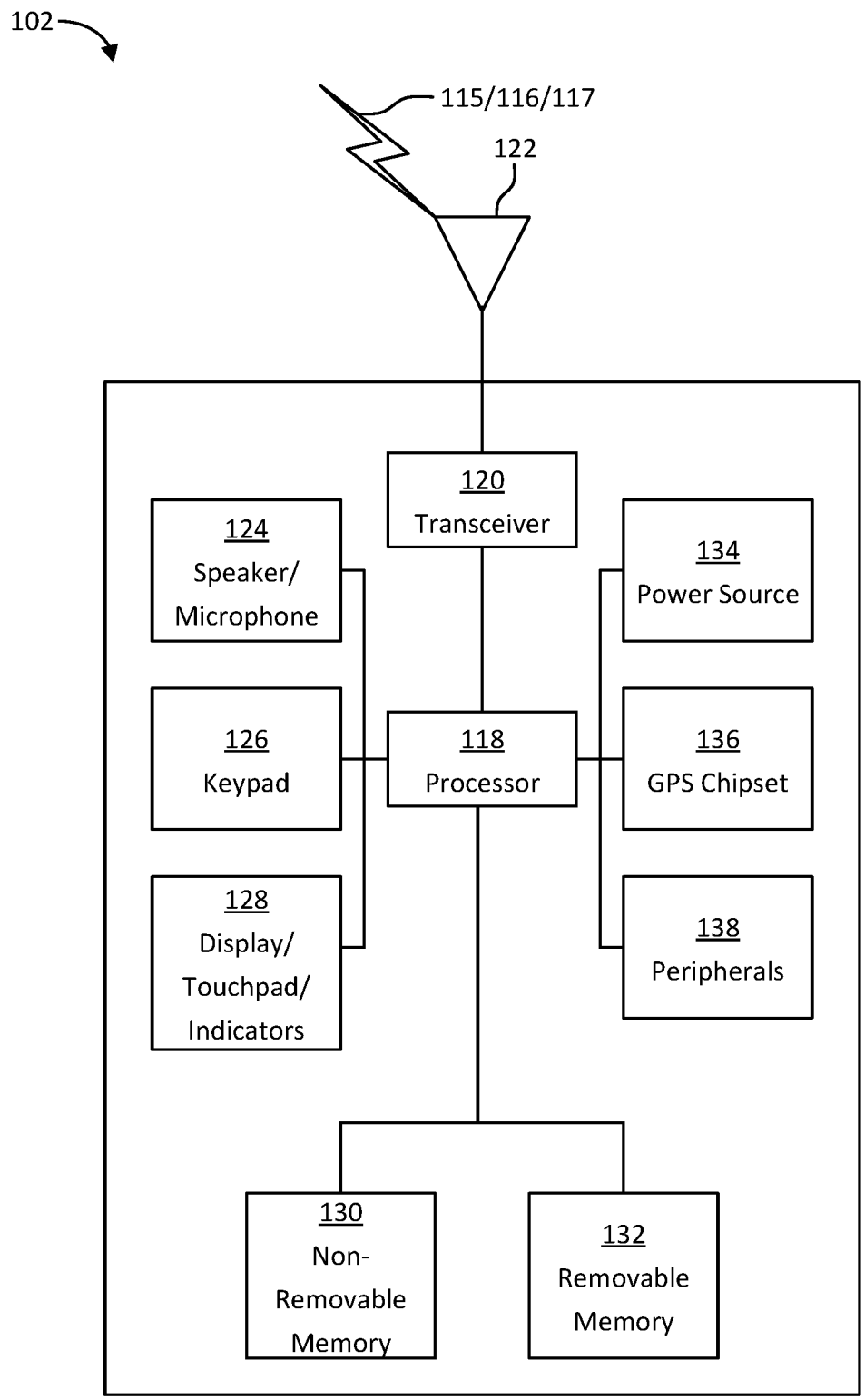
FIG. 13 is a block diagram of an example apparatus or device configured for wireless communications such as, for example, a wireless transmit/receive unit (WTRU).

FIG. 13 is a block diagram of an example apparatus or device configured for wireless communications in accordance with the embodiments illustrated herein, such as for example, a WTRU 102. As shown in FIG. 13, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 12, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 12 may be configured to communicate with the base station 114a, which may employ a cellular-based radio technology, and with the base station 114b, which may employ an IEEE 802 radio technology.

FIG. 13 is a block diagram of an example apparatus or device configured for wireless communications in accordance with the embodiments illustrated herein, such as for example, a WTRU 102. As shown in FIG. 13, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 13 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 13 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 14:
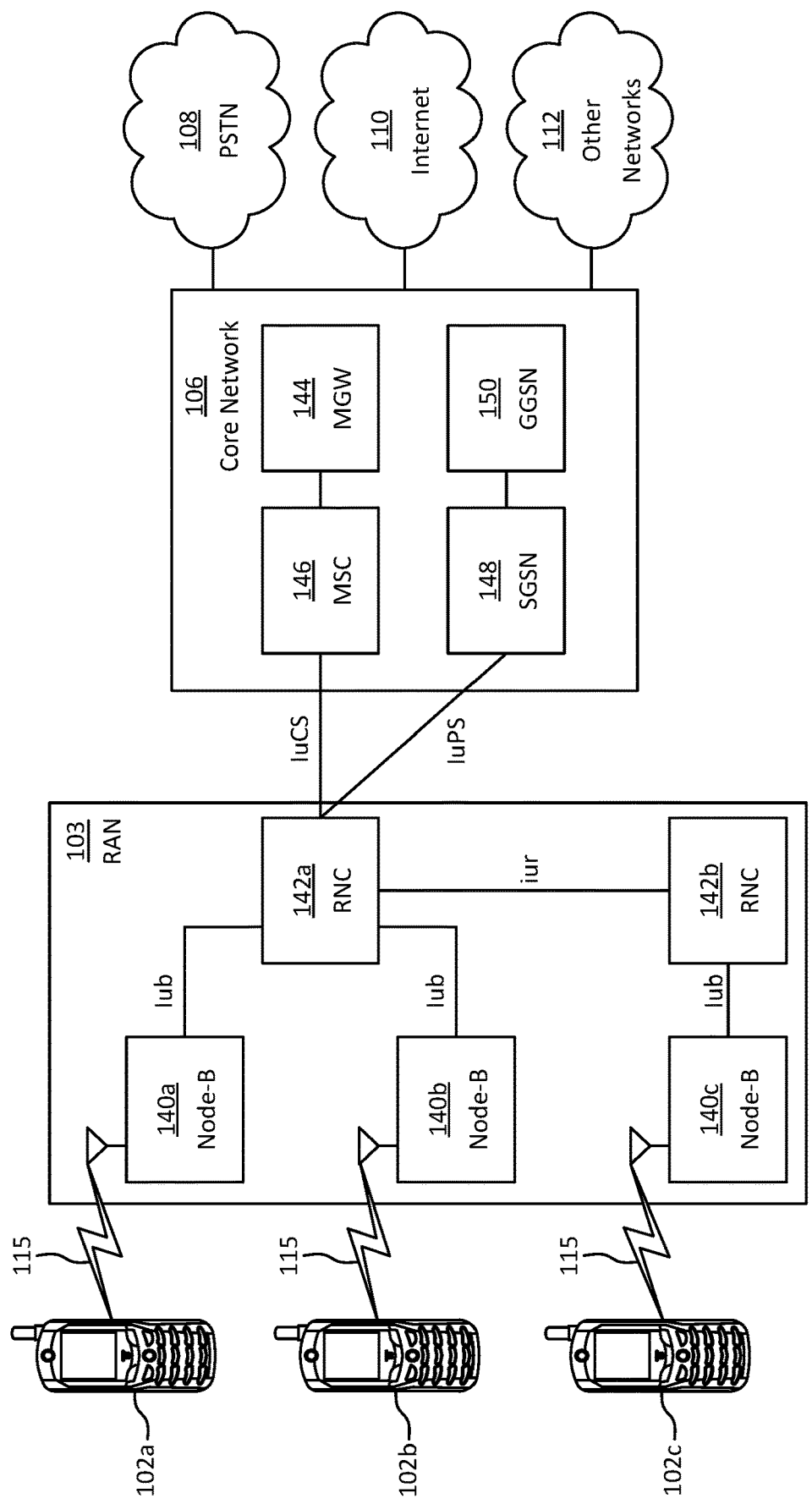
FIG. 14 is a system diagram of a first example radio access network (RAN) and core network.

FIG. 14 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 14, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 14, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 14 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 15:
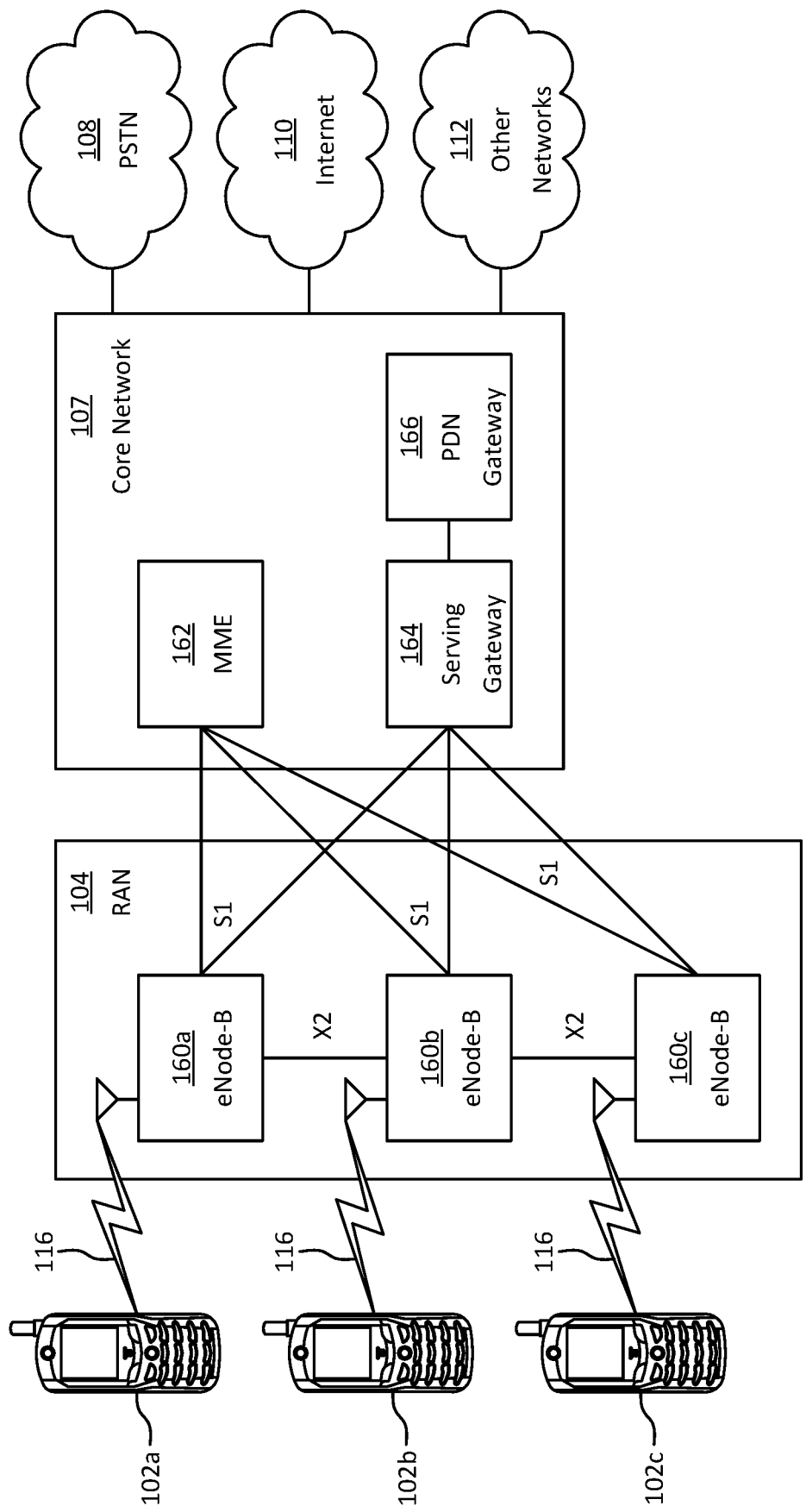
FIG. 15 is a system diagram of a second example radio access network (RAN) and core network.

FIG. 15 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 15, the eNode-Bs 160a, 160b, 160c may communicate with one another over an X2 interface.

The core network 107 shown in FIG. 15 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 16:
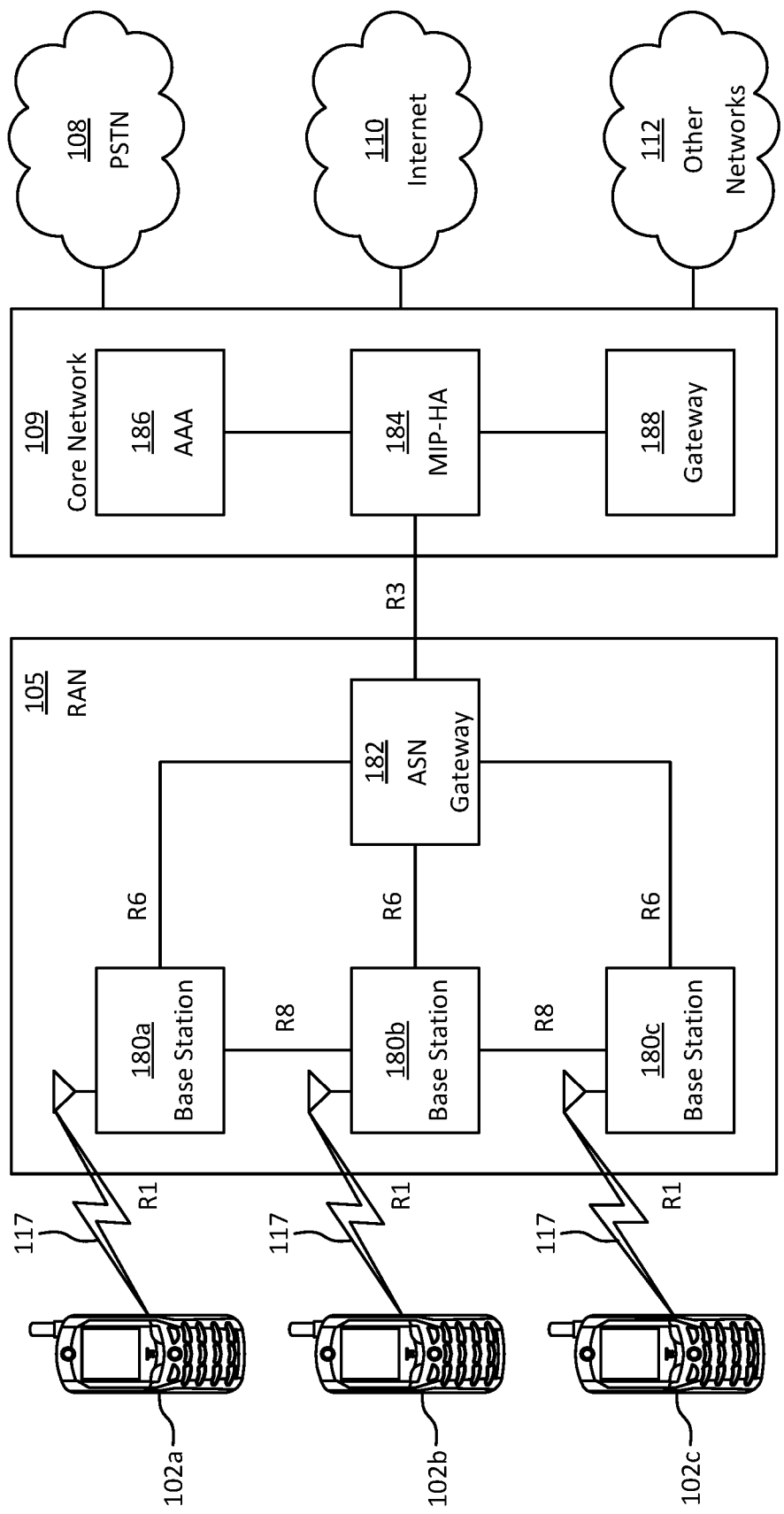
FIG. 16 is a system diagram of a third example radio access network (RAN) and core network.

FIG. 16 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 16, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 16, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 16, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 4-8 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 4-8 are provided by way of example only, and it is understood that the subject matter disclosed and claimed herein may be embodied or implemented in any similar communication system, whether presently defined or defined in the future.

Figure 17:
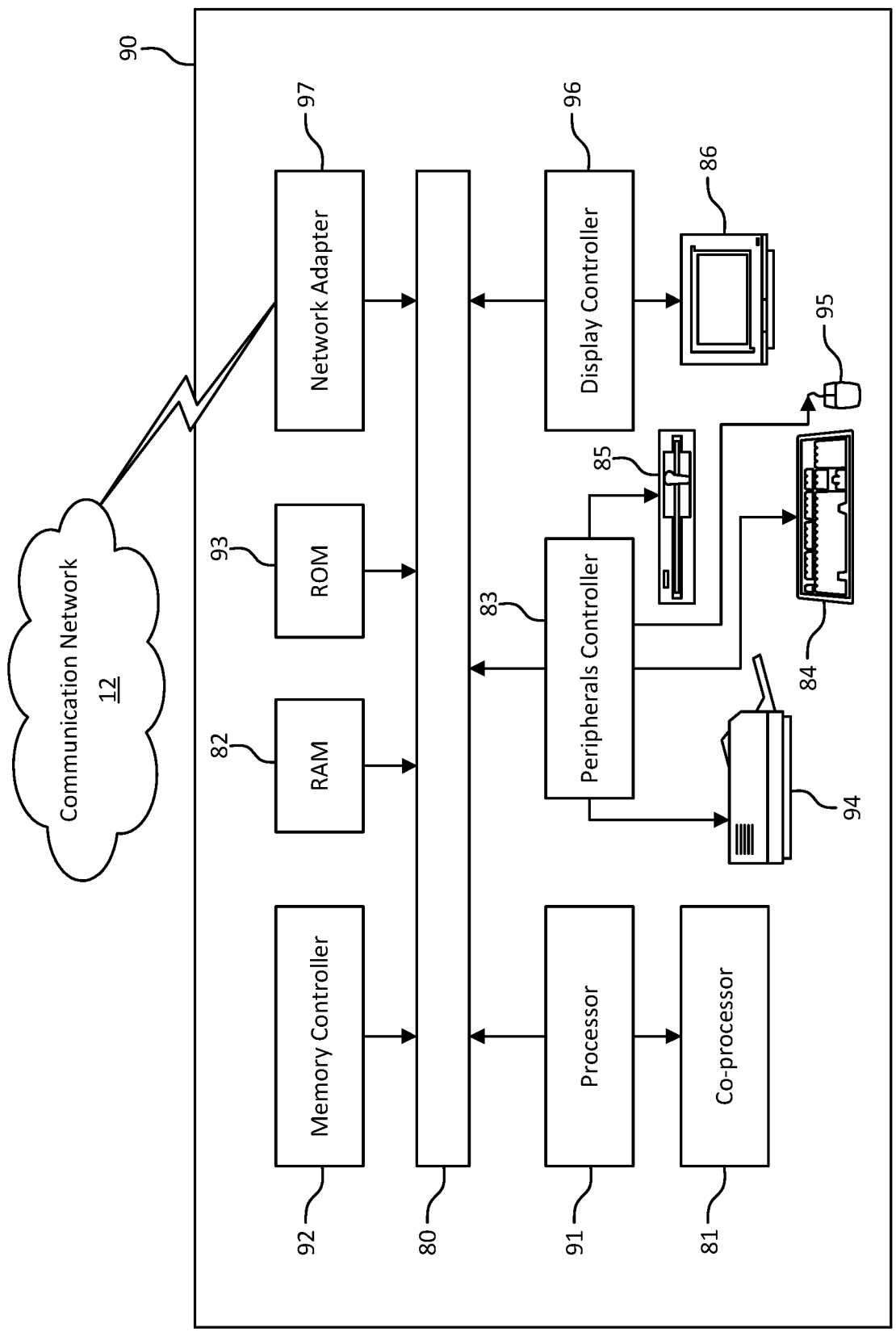
FIG. 17 is a block diagram of an exemplary computing system in which one or more apparatuses of communications networks may be embodied, such as certain nodes or functional entities in the RAN, core network, public switched telephone network (PSTN), Internet, or other networks.

FIG. 17 is a block diagram of an exemplary computing system 90 in which one or more apparatuses of the communications networks illustrated in FIGS. 4-8 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 4-8, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

TABLE 1

ACRONYMS

| | |
|---|---|
| A/N | Ack/Nack |
| BRS | Beam Reference Signal |
| CE | Control Element |
| DL | Downlink |
| DRX | Discontinuous Reception |
| eMBB | enhanced Mobile Broadband |
| ETWS | Earthquake and Tsunami Warning System |
| HARQ | Hybrid Automatic Repeat Request |
| KPI | Key Performance Indicators |
| LCP | Logical Channel Prioritization |
| LTE | Long term Evolution |
| MAC | Medium Access Control |
| MIB | Master Information Block |
| mMTC | massive Machine Type Communication |
| NACK | Non-ACKnowledgement |
| NR | New Radio |
| PBCH | Physical Broadcast Channel |
| PDCCH | Physical Downlink Control Channel |
| PDSCH | Physical Downlink Shared Data Channel |
| PRACH | Physical Random Access Channel |
| PRB | Physical Resource Block |
| RAN | Radio Access Network |
| RNTI | Radio Network Temporary Identifier |

TABLE 1-continued

ACRONYMS

| | |
|---|---|
| RRC | Radio Resource Control |
| SI | System Information |
| SIB | System Information Block |
| SR | Scheduling Request |
| TDD | Time Division Duplex |
| UE | User Equipment |
| UL | Uplink |
| URLLC | Ultra-Reliable and Low Latency Communications |

TABLE 2

KPIS FOR EMBB, URLLC AND MMTC DEVICES

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that may be used within the next generation access architecture. | 0.5 ms |
| | Reliability | Reliability may be evaluated by the success probability of transmitting X bytes (1) within 1 ms, which is the time it takes to deliver a small data packet from the radio protocol layer ⅔ SDU ingress point to the radio protocol layer ⅔ SDU point of the radio interface, at a certain channel quality (e.g., coverage-edge). NOTE1: Specific value for X is FFS. | 1-10-5 within 1 ms. |
| mMTC | Coverage | "Maximum coupling loss" (MCL) in uplink and downlink between device and Base Station site (antenna connector(s)) for a data rate of [X bps], | 164 dB |

TABLE 2-continued

KPIS FOR EMBB, URLLC AND MMTC DEVICES

| Device | KPI | Description | Requirement |
|---|---|---|---|
| | | where the data rate is observed at the egress/ingress point of the radio protocol stack in uplink and downlink. | |
| | UE Battery Life | User Equipment (UE) battery life may be evaluated by the battery life of the UE without recharge. For mMTC, UE battery life in extreme coverage may be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
| | Connection Density | Connection density refers to total number of devices fulfilling specific Quality of Service (QoS) per unit area (per km2). QoS definition should take into account the amount of data or access request generated within a time t_gen that may be sent or received within a given time, t_sendrx, with x % probability. | 106 devices/km2 |

TABLE 3

SR CONFIGURATION

| SR configuration Index $I_{SR}$ | SR Periodicity (ms) $SR_{periodicity}$ | SR subframe offset $N_{offset,SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

EXAMPLE 1
SR CONFIGURATION STRUCTURE

```
SchedulingRequestConfig ::=    CHOICE {
    release                    NULL,
    setup                      SEQUENCE {
        sr-PUCCH-ResourceIndex     INTEGER (0..2047),
        sr-ConfigIndex             INTEGER (0..157),
        dsr-TransMax               ENUMERATED  {n4, n8, n16,
                                                n32, n64, spare3,
                                                spare2, spare1}
    }
}
```

We claim:

1. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
delay, based on an upcoming uplink grant, a random access channel procedure for a tracked duration, wherein the upcoming uplink grant is available for buffer status reporting (BSR).

2. The apparatus of claim 1, wherein the random access channel procedure is associated with a physical random access channel (PRACH).

3. The apparatus of claim 1, wherein the instructions further cause the apparatus to: determine, based on logical channel restrictions of the upcoming uplink grant, whether to delay the random access channel procedure.

4. The apparatus of claim 1, wherein the instructions further cause the apparatus to:
determine BSR is transmitted using the upcoming uplink grant; and
cancel tracking of the tracked duration.

5. The apparatus of claim 1, wherein the instructions further cause the apparatus to perform, subsequent to the delay, a random access procedure when:
there is no uplink grant, within the allowed latency, available to transmit the BSR.

6. The apparatus of claim 1, wherein the instructions further cause the apparatus to perform, subsequent to the delay, a random access procedure when:
a buffer status report (BSR) is triggered and not cancelled,
there is no scheduling request (SR) resource, and
there is no uplink grant, within the allowed latency, available to transmit the BSR.

7. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
determine that a Buffer Status Report (BSR) has been triggered;
determine there is an upcoming uplink grant associated with the apparatus, wherein the upcoming uplink grant has a time duration;
determine that a transmission of the BSR cannot be sent during the time duration associated with the upcoming uplink grant; and
based on the determination that the BSR transmission cannot be sent during the time duration, then trigger a scheduling request (SR).

8. The apparatus of claim 7, the instructions further cause the apparatus to:
determine there is no physical uplink control channel (PUCCH) resource available for transmission of the triggered SR; and
based on no PUCCH resource being available for transmission of the triggered SR, initiate a random access channel (RACH) procedure.

9. The apparatus of claim 7, the instructions further cause the apparatus to when multiple SRs are pending and a first SR is indicated as successful, determine that remaining SRs of the multiple SRs are cancelled.

10. The apparatus of claim 7, the instructions further cause the apparatus to:
determine that a Beam Recovery Request (BRR) has been triggered at the same time as the SR:
suspend the pending SR based on the determination that the BRR has been triggered at the same time as the SR;
transmit the BRR over a physical uplink control channel (PUCCH) resource;
receive a valid BRR command; and
resume the pending SR based on reception of the valid BRR command.

11. A method comprising:
   determining that a Buffer Status Report (BSR) has been triggered;
   determining there is an upcoming uplink grant associated with the apparatus, wherein the upcoming uplink grant has a time duration;
   determining that a transmission of the BSR cannot be sent during the time duration associated with the upcoming uplink grant; and
   based on the determination that the BSR transmission cannot be sent during the time duration, then trigger a scheduling request (SR).

12. The method of claim 11, the method comprising:
   determining there is no physical uplink control channel (PUCCH) resource available for transmission of the triggered SR; and
   based on no PUCCH resource being available for transmission of the triggered SR, initiating a random access channel (RACH) procedure.

13. The method of claim 11, the method comprising:
   determine that a Beam Recovery Request (BRR) has been triggered at the same time as the SR;
   suspend the pending SR based on the determination that the BRR has been triggered at the same time as the SR;
   transmit the BRR over a physical uplink control channel (PUCCH) resource;
   receive a valid BRR command; and
   resume the pending SR based on reception of the valid BRR command.

14. The method of claim 11, the method comprising:
   determine that a Beam Recovery Request (BRR) has been triggered at the same time as the SR; and
   transmit the BRR and the SR over a single PUCCH resource.

15. The method of claim 11, wherein the PUCCH resource is shared for transmission of the SR and the BRR.

16. The method of claim 11, wherein the PUCCH resource is shared for transmission of the SR and the BRR, wherein the PUCCH resource carries an indication, indicating if the content is the SR, the BRR, or a combination of the SR and the BRR.

17. The method of claim 11, the method comprising:
   determine that an SR failure has occurred;
   determine the impacted PUCCH resources, based on the determination that the SR failure has occurred;
   release the impacted PUCCH resources; and
   notify a second apparatus, based on the determination that the SR failure has occurred.

18. The method of claim 17, wherein the SR failure is determined per SR configuration, per serving cell, per bandwidth part (BWP) or wherein the notification includes an SR configuration index.

19. The method of claim 11, the method comprising when multiple SRs are pending, determine which pending SR to prioritize based on one or more of the following: the SR configuration with the most transmission opportunities, the SR configuration that corresponds to the highest priority logical channel, the SR configuration using a long PUCCH format, or the SR configuration using a short PUCCH format.

* * * * *

UNITED STATES PATENT AND TRADEMARK OFFICE
CERTIFICATE OF CORRECTION

PATENT NO. : 12,120,730 B2  
APPLICATION NO. : 17/555933  
DATED : October 15, 2024  
INVENTOR(S) : Guodong Zhang et al.

Page 1 of 1

It is certified that error appears in the above-identified patent and that said Letters Patent is hereby corrected as shown below:

In the Claims

In Claim 4: Column 50, Line 10, delete "determine", and insert --determine that the--

In Claim 6: Column 50, Line 22, delete "(BSR)"

In Claim 6: Column 50, Line 25, delete "BSR", and insert --buffer status report--

In Claim 13: Column 51, Line 21, delete "comprising:", and insert --comprising the following steps:--

In Claim 14: Column 52, Line 1, delete "comprising:", and insert --comprising the following steps:--

In Claim 17: Column 52, Line 13, delete "comprising:", and insert --comprising the following steps:--

Signed and Sealed this  
Eleventh Day of February, 2025

Coke Morgan Stewart  
*Acting Director of the United States Patent and Trademark Office*